US010497165B2

(12) United States Patent
Vats et al.

(10) Patent No.: US 10,497,165 B2
(45) Date of Patent: Dec. 3, 2019

(54) TEXTURING OF 3D-MODELS OF REAL OBJECTS USING PHOTOGRAPHS AND/OR VIDEO SEQUENCES TO FACILITATE USER-CONTROLLED INTERACTIONS WITH THE MODELS

(71) Applicants: Nitin Vats, Meerut (IN); Gaurav Vats, Meerut (IN)

(72) Inventors: Nitin Vats, Meerut (IN); Gaurav Vats, Meerut (IN)

( * ) Notice: Subject to any disclaimer, the term of this patent is extended or adjusted under 35 U.S.C. 154(b) by 0 days.

(21) Appl. No.: 14/214,697

(22) Filed: Mar. 15, 2014

(65) Prior Publication Data
US 2016/0307357 A1 Oct. 20, 2016

(51) Int. Cl.
G06T 15/04 (2011.01)
G06T 19/00 (2011.01)
G06T 15/50 (2011.01)

(52) U.S. Cl.
CPC ................................. G06T 15/04 (2013.01)

(58) Field of Classification Search
None
See application file for complete search history.

(56) References Cited

U.S. PATENT DOCUMENTS

| | | | | |
|---|---|---|---|---|
| 5,898,438 A * | 4/1999 | Stewart | ................... | G06T 15/04 345/419 |
| 6,009,190 A * | 12/1999 | Szeliski | ................. | G06K 9/209 345/427 |
| 6,300,958 B1 * | 10/2001 | Mallet | ..................... | G06T 15/04 345/442 |
| 6,697,538 B1 * | 2/2004 | Angenent | ............... | G06T 19/00 382/285 |
| 8,749,580 B1 * | 6/2014 | Lininger | ............... | G11B 27/322 345/473 |
| 8,817,018 B1 * | 8/2014 | Fan | ......................... | G06T 17/05 345/419 |
| 2002/0050988 A1 * | 5/2002 | Petrov | ...................... | G06K 9/20 345/418 |
| 2004/0095357 A1 * | 5/2004 | Oh | ......................... | G06T 15/205 345/589 |

(Continued)

OTHER PUBLICATIONS

Pollefeys et al.; "Visual Modeling with a Hand-Held Camera;" International Journal of Computer Vision; Sep. 2004, vol. 59, Issue 3, pp. 207-232.*

*Primary Examiner* — Edward Martello
(74) *Attorney, Agent, or Firm* — Crose Law LLC; Bradley D. Crose

(57) ABSTRACT

Texturing of external and/or internal surfaces, or on internal parts of 3D models representing real objects, for providing extremely real-like, vivid and detailed view on and/or within the 3D-model, is made possible using a plurality of real photographs and/or video of the real objects. The 3D models are 3D computer graphics models used in user-controlled interactions implementation purpose. The view of texture on the 3D-model that is textured using real photographs and/or video replicates view of texture as on the real 3D object. Displaying realistic texture on 3D-model surface applying video as texture is made possible replicating real view of light blinking from a physical light emitting device of real object such as head light or rear light of an automotive vehicle.

30 Claims, 18 Drawing Sheets

(56) References Cited

U.S. PATENT DOCUMENTS

| | | | |
|---|---|---|---|
| 2005/0089213 A1* | 4/2005 | Geng | G06K 9/00214 |
| | | | 382/154 |
| 2006/0028489 A1* | 2/2006 | Uyttendaele | G06T 15/205 |
| | | | 345/646 |
| 2009/0015585 A1* | 1/2009 | Klusza | G06F 17/3028 |
| | | | 345/420 |
| 2009/0021514 A1* | 1/2009 | Klusza | G06F 17/3028 |
| | | | 345/419 |
| 2013/0124156 A1* | 5/2013 | Wolper | G06T 17/00 |
| | | | 703/1 |

* cited by examiner (a)

(b)

(c)

(d)

(e)

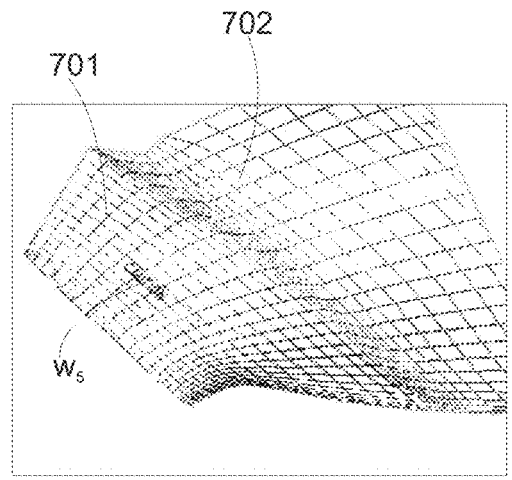
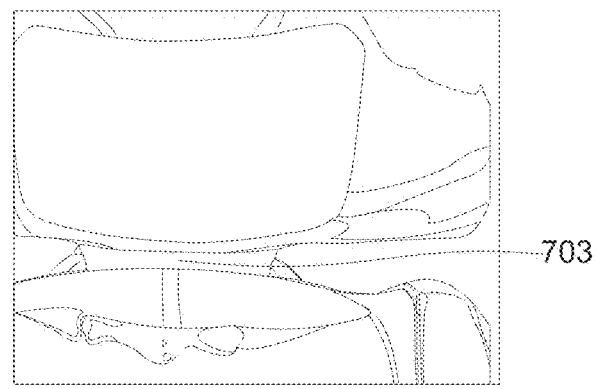
FIG. 7a
FIG. 7b
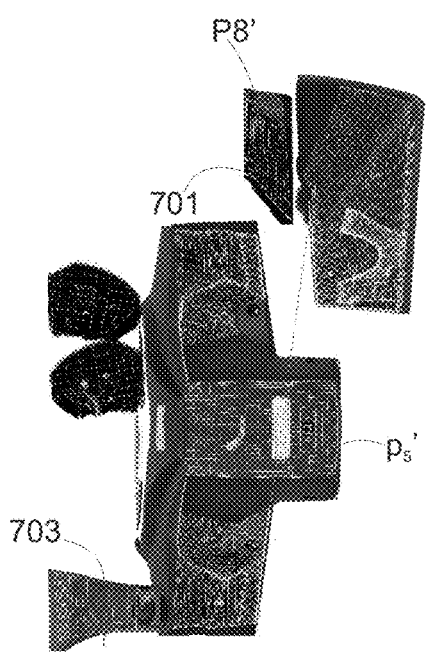
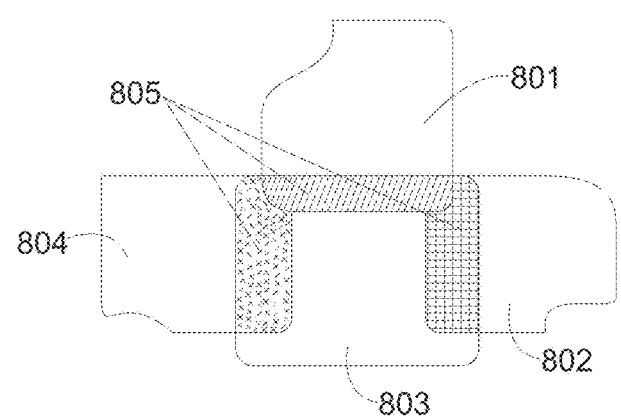
FIG. 7c
FIG. 8

TEXTURING OF 3D-MODELS OF REAL OBJECTS USING PHOTOGRAPHS AND/OR VIDEO SEQUENCES TO FACILITATE USER-CONTROLLED INTERACTIONS WITH THE MODELS

FIELD OF THE INVENTION

The present invention relates to field of texturing in three dimensional (3D) computer graphics, particularly texturing of a 3D-model of a real object using photographs and/or video of the real object for use in user-controlled interactions implementation.

BACKGROUND OF THE INVENTION

Currently, real/physical products or objects are displayed digitally with the help of images, photographs or videos for representing a real object in various implementations. A 3D computer graphics model is a better option to represent a real product, however existing 3D computer graphics model rendered in real-time lack in realism, and look unreal or artificial due to artificial looking texture on the 3D computer graphics model, hereinafter referred to as 3D model. Even 3D model generated in non-real time rendering such as in making animation movies also lack realism or real texture. Efforts have been made to use 3D model to represent a real car in some implementation, where electronic systems display 3D models of car with pre-defined and/or very limited interactions possibilities available for users with the 3D models of car. However the 3D models in such systems still looks cartoonish or artificial due to use of artificial colour or images as texture. For example, in case of 3D model of a real car textured using conventional texturing methods or techniques, interiors, seats, steering, and other internal and/or external parts looks unreal.

Currently texture of 3D models of real products such as car, bikes, home appliances or objects of complex structure or geometry are made by texture artist by synthesizing or creating artificial texture using different parameters such as colours, shine or glossiness, reflectivity, bumps etc with the objective to provide look and feel of realistic texture using different applications or software. However, it is observed that this kind of texture mapping gives an artificial look, and the textured 3D models of real 3D objects do not look real. It is understood that real photographs cannot be replaced by artificial texture because all surfaces of a real object do not carry a single uniform texture pattern, which cannot be created artificially, and that texturing will be an artistic job or not exact like a photograph. Further, to display reality-based textures during blinking of real light from light emitting device such as head light of an automotive vehicle, is challenging using conventional texturing techniques, systems or methods. Instead of creating artificial texture, if real photographs and/or video of external and internal parts of real 3D object, like car are used as a texture for the 3D-model, then the 3D model of car will look extremely real both from exterior and interior view. However, using real photographs for texture mapping of external and internal surfaces of external and internal parts of 3D model pose a lot of challenges discussed below.

Further in some implementations, one or more patches are mapped using photographs while other areas in the 3D model are painted by texture artist using artificial texture. Currently texture mapping in computer graphics related to texturing of 3D model are limited to mostly texturing of only exterior or outside region of 3D-models using primarily artificial texture such as images other than photographs, colours using a texture map. Unwrapping of the 3D model, and then providing a functional UV layout before applying texture map is known. However, retaining precise details, texturing of hidden regions due to fitting of one part with another part (discussed in FIG. 8), and texturing of internal parts to texture 3D model using numerous photographs, say in hundreds or thousands real photographs and/or video is a challenge and problem unaddressed in art. In some implementations, where photographs are used, only a few photographs (generally a few in number, usually ranging from 2-20) of full body from different angles are used for texturing of 3D models, and that too usually for external surfaces limited to planar surfaces or surfaces that are not of complex geometry. However, such texturing using conventional techniques, methods and systems cannot provide or retain minute details and vivid appearance in the 3D model. One of the reasons for lacking details is photograph capturing manner, and that individual parts in real object are either not or rarely segregated/dismantled for capturing detailed or close-up photographs from each face of the segregated part. Further adjusting or calibration of different photographs, and alignment on UV layouts of external and internal surfaces maintaining visual consistency and removing any distortion or visible artifacts is a difficult problem. Photograph based texturing of 3D model is a complex problem in real time rendering (the outcome of user controlled interaction implementation), as image data is heavy compared to using colours as texture. Although non-real time rendering can handle very heavy texture, still limited attempts have been made to use real photographs as texture. However, such attempts could not show real look and feel as of real object, or in other words the results obtained looked cartoonish. For example, in an implementation as discussed in a paper titled "Texture Montage: Seamless Texturing of Arbitrary Surfaces From Multiple Images", published in ACM Transactions on Graphics (TOG)—Proceedings of ACM SIGGRAPH 2005, Volume 24 Issue 3, July 2005, Pages 1148-1155, discusses about automatically partitioning of a single body 3D model mesh and the images, where mapping is driven solely by the choice of feature correspondences, while a surface texture in-painting technique is used to fill in the remaining charts of the surface with no corresponding texture patches. Further in some implementation as discussed in a publication titled "Texturing internal surfaces from a few cross sections," Comput. Graph. Forum, vol. 26, pp. 637-644, 2007, is limited to be used for carving objects or texturing internal surfaces in cutting simulation by taking cross-section photographs of real objects. Additionally, the technique is limited to synthesis of colour by texture morphing, which is an approximation and not exact representation of factual details of photographs due to difficulty in texturing of internal surfaces using photographs directly. Further, difficulty increases when the internal surface is also multi-faceted and of complex geometry such as automobile vehicle. Again further, such 3D computer model cannot represent internal parts which are separable, and texturing of further exterior and inner surface of internal parts becomes very difficult and a challenging problem. For the same reason, current textured 3D model of complex geometry such as cars, bikes, complex machineries look cartoonish.

In some implementations costly 3D scanners are used to create 3D models, followed by automated texture mapping usually using images or silhouette images. In such scanning systems, generated 3D model is a solid body or a shell type single body of exterior of the real object. For example, if a complex 3D object with complicated geometry such as car is subjected to scanning, the generated 3D-model will be a single body depicting outer surface or region of car with very high polygonal faces. Here, sub-parts such as car doors, window, and bonnet cannot be separated in the generated 3D-model. Additionally and importantly, scanning interior of car, and further texturing of interior will be very difficult with known systems, and a costly affair.

Now, for the purpose of understanding this invention, a 3D-model is a 3D computer graphics model representing a real or physical object, where the 3D computer graphics model representing a real 3D object is used in user-controlled interactions. The 3D-model is either a single body 3D model or multi-part 3D model having external and/or internal parts to form a single 3D-model. As used in this description and in the appended claims, the user-controlled interactions are interactions performed by a user in real-time with a 3D-model representing a real object, where on providing an input by the user, a corresponding response is seen in the 3D computer model, and where the response is generated by real-time rendering of corresponding view of 3D model as output. For example, the response can be a movement in the entire 3D model, or a part of the 3D model showing movement to a different position from initial state or position, or any texture change will result in change in view of the 3D model. The user-controlled interactions are performed as per user choice, or in other words controlled by user. The user-controlled interactions also includes the user-controlled realistic interactions, an advance form of user-controlled interactions, that are discussed in details in U.S. patent application Ser. No. 13/946,364, Patent Cooperation Treaty (PCT) Application No. PCT/IN2013/000448, Indian Patent application No. 2253/DEL/2012, all now pending, filed by the same applicants as of this application. Traditionally, texturing is carried out using colours and/or images. The images when used for texturing are either artificially created, or created to resemble texture close to photographs.

Therefore, there exists a challenge to texture the 3D models from external or internal surfaces, or on internal parts, using a plurality of real photographs and/or video for providing extremely realistic and detailed view on and/or within the 3D-model. A further challenge exists to texture the 3D models using photographs/video such that the 3D models are able to support user-controlled interactions or support real-time rendering.

Further, it is also a challenge to obtain a 3D model with texture same and as realistic as of captured photographs of physical object without much increase in the file size of the texture data of 3D-model. It is due to the size increase as one of the problems that most texture mapping processes use only a patch from original photographs of physical objects for texture mapping in one plane, colouring or painting other left-over un-textured portions. Now, to texture a 3D model of very complicated 3D structure having complex geometry such as automobiles, electronic objects, and machineries etc for external and internal surfaces of external and internal parts using real photographs for retaining factual details is a real challenge and a problem to be solved. For example in case of 3D model such as mobile, the multi-part 3D-model of mobile includes parts viewed from outside such as display, keys, body, battery cover etc, and internal parts such as battery, interior of mobile, inner side of battery cover, SIM slots etc. It is relatively easy to texture on the outer body of 3D-model as a whole, but difficulty increases to map texture on functional parts such as keys in mobile as keys, when the functional parts are movable or can be pressed during a user-controlled interaction. The difficulty level further increases if texture is to be mapped on internal parts such as integrated SIM slot positioned beneath mobile battery, which in turn is positioned beneath battery cover, and the inner side of the battery cover in one example of 3D-model of mobile. The application of photographic images or video on UV layouts of the functional and internal parts of 3D model for texture mapping, and also simultaneously retaining the functionality of all disintegrated parts is a challenge and a problem unaddressed in the art. Additionally, during user-controlled realistic interactions as mentioned in patent application Ser. No. 13/946,364 filed on Jul. 19, 2013, now pending, by the same applicants as of this application, view of the 3D-model changes as per interactions performed by user choice. Thus, a further need arises to integrate texturing using photographs and/or video with dynamic texture changing ability on a same part or different sub-parts depending on the user-controlled interactions, where the texture comes from real photographs and/or video of real objects in cost-effective, and simplified manner, and for increased realism in view of 3D models during user-controlled realistic interactions.

The present invention is also directed to overcoming or at least reducing one or more of the challenges, difficulties and problems set forth above.

SUMMARY OF THE INVENTION

In one aspect of the present invention, a method is provided for photograph-based texturing of external and/or internal surfaces of a 3D model of a real 3D object. The method makes possible providing highly realistic texture to the 3D-models by applying numerous detailed photographs of the real 3D objects. The method makes possible providing extremely vivid appearances on and within the 3D-model, while retaining factual and precise details of the real 3D object such that textured 3D model look real both from exterior and interior side, and look real even when individual parts are separated from the 3D model during user-controlled realistic interactions such as intrusive interactions (further described in detail description below). The method involves capturing HD (high definition) photographs of external and/or internal surfaces in different photographs capturing manners, and applying the photographs on each UV layout of 3D model and then joining the UVs of different surfaces by applying different calibration techniques on the photographs and UV layouts.

In another aspect of the present invention, a texturing method of a three-dimensional (3D) model of a real 3D object using photograph and/or video for displaying real-time change of textures on the 3D model by real-time rendering during user-controlled interactions is provided. The method makes possible use of video in texturing, to further enhance view of 3D model's texture, and display realistic texture during user-controlled interactions. For example, in an user-controlled realistic interaction to show lighting effect, where user desires to see lights on and off or blinking in a sub-part of a 3D model, the method of present invention makes possible displaying realistic texture using video replicating real view of light blinking from a physical light emitting device such as head light or rear light of an automotive vehicle.

In further aspect of the present invention, a display method is provided for displaying a 3D model in a virtual three-dimensional space on a Graphical User Interface (GUI) for performing user-controlled interactions. The method uses calibrated textures obtained using photographs/video of a real object for implementing user-controlled interactions on the 3D model, which makes possible displaying rendered graphics of 3D model as output of the performed user-controlled interaction in real-time in response to the user input, wherein the texture displayed on external and/or internal surfaces of 3D model in—or—during each user-controlled interaction is calibrated texture obtained using photographs and/or video of the real object. The calibrated textures on the 3D model make the 3D model look real. The realism is maintained in—or during—each user-controlled interaction performed and displayed.

In yet further aspect of the present invention, a system is provided for displaying a 3D model in a virtual three-dimensional space on a Graphical User Interface (GUI) and performing user-controlled interactions with the 3D model in real-time.

The present invention makes possible texturing of external and/or internal surfaces of the 3D model using real photographs and/or video, where view of texture on the 3D-model that is textured using real photographs and/or video replicates view of texture as on the real 3D object. In one implementation, additionally texture made by photo-editing of real photographs and/or videos of the real 3D object and/or the real 3D object's variants; images other than photographs such as artificially created images, or images created to resemble texture close to photographs. Artificial colour can be optionally used for texturing only for surfaces which correspond to mono-colour surfaces in the real object to keep file size low without compromising on looks. When images other than photographs are optionally used in texturing, use of photographic images in total UV layouts for texturing ranges from 10-100% of total number of images other than real photographs. Further, although a plurality of real HD photographs, for example in hundreds or thousands in case of complex 3D objects such as automotive vehicles such as bike, are used for texturing the 3D model in the methods and the system of the present invention, it makes no or minimum visible impact on the rendering and displaying time, and real-time viewing of textured 3D model object even if data is transmitted over web-page via hypertext transfer protocol (HTTP), and maintains precise detailing and clarity even on zooming the 3D models such that even a mark region such as logo, symbol or written instructions are clearly visible on the textured 3D model.

BRIEF DESCRIPTION OF THE DRAWINGS

The invention and many advantages of the present invention will be apparent to those skilled in the art with a reading of this description taken in conjunction with the accompanying drawings, in which like reference numerals identify like elements, and in which:

FIG. 7a shows a front guard part surfaces on the 3D model of FIG. 4;

FIG. 7b shows a front neck part of the selected surface of the 3D model of FIG. 4;

FIG. 7c shows joining all UVs of related UV layout to form texture for the selected surfaces of the 3D model of FIG. 4 in an example;

FIG. 8 illustrates hidden regions of fitted parts of a real 3D object in an example;

Figure 1:
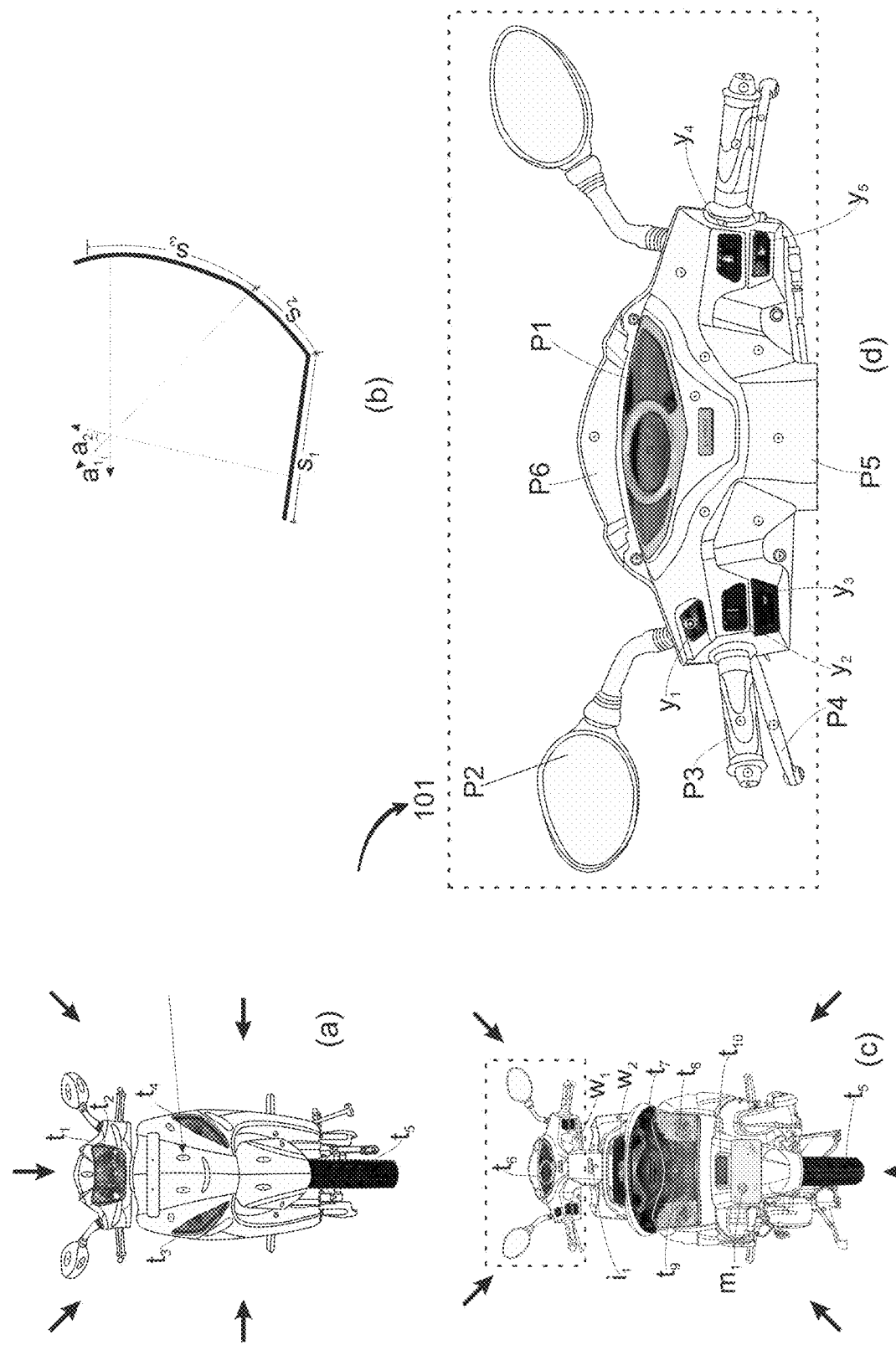
FIG. 1 illustrates, through illustrations (a)-(d), different photographs capturing manners of external surfaces, in an example, used in texturing with the help of a front view and a rear view of a real 3D object, here represented by a scooter, and also with the help of an enlarged view of a handle and meter portion of the scooter, according to an embodiment of the present invention.

While the invention is susceptible to various modifications and alternative forms, specific embodiments thereof have been shown by way of example in the drawings and are herein described in detail.

DETAILED DESCRIPTION

Referring to FIG. 1, different photographs capturing manners of external surfaces of a real 3D object, here represented by a scooter, used in a texturing method according to an embodiment of the present invention, is illustrated.

In illustration (a) of FIG. 1, a front view of the scooter is shown, where the external surfaces of the scooter is photographed from various angles and ways to capture precise factual details in photographs used for texturing of 3D models according to an embodiment of the present invention. External as well as internal surfaces of the scooter are photographed using a photographing device, preferably a digital camera. The camera is preferably a non-fixed and high resolution camera. The thick arrow shows different field of views or angles for capturing the whole surface of the scooter. Other captured photographs includes photographs of each face or sub-surface of the surface, where sub-surface or faces are captured normal to the face or plane, as shown by a thin arrow pointing to a small oval circle placed on a face of front of scooter with an asterisk mark within the circle denoting normal to the face/sub-surface. Such circle with asterisk mark are placed on different faces in illustration (a) and illustration (d) of FIG. 1 to denote angle and focus while capturing photographs of each face or sub-surface. Faces are considered to be different if their normal differ in more than 5 degree from adjacent face on a same surface, as shown in illustration (b) of FIG. 1, where a schematic representation of a stretch ($s_1,s_2,s_3$) of external surface is shown in a curvature. An angle ($a_1$) of normal (shown by dotted arrow) between a first stretch ($s_1$) and a second stretch ($s_2$) is greater than 5 degree, and thus the stretches ($s_1,s_2$) are considered different faces. Similarly, the normal between a third stretch ($s_3$) and the second stretch ($s_2$) of the same surface has an angle ($a_2$) which is also greater than 5 degree, and therefore the third stretch ($s_3$) is taken as another face eligible for capturing a photograph of stretch ($s_3$) normal to the stretch ($s_3$). It should be understood that the angle of 5 degree is preferred way to distinguish between faces during capturing of photographs, however the present invention should not be deemed as limited to a specific embodiment of capturing photographs used for texturing, and that different variation distinguishing between faces can be used by a person ordinary skilled in art such as angle within range 4-25 degree, a visual distinction etc.

Further, if a texture or shade is different in a same surface or different surfaces, the texture and shade is captured individually for use in detailed and precise texturing of 3D model. In illustration (c) of FIG. 1, a rear view of the scooter in an example is shown to further explain the capturing of photographs for external surfaces in terms of textures, shade and mark region such as written words and/or instructions on the scooter (the real 3D object). Different textures ($t_1$-$t_{10}$) and mark region such as written instructions ($i_1$), words ($w_1,w_2$), mark ($m_1$), symbols ($y_1$-$y_5$) appearing on sub-surfaces of external surface are photographed separately, as shown on illustrations (a), (c) and (d) of FIG. 1, for capturing factual details to be used later for texturing of a 3D model of scooter. A portion of the 3D model and an entire 3D model of scooter shown schematically in FIG. 4 and FIG. 11 respectively.

In illustration (d) of FIG. 1, different parts (p1-p6) and the symbols ($y_1$-$y_5$) are shown using an enlarged view of a handle and meter portion (101) of illustration (c) in an example to further demonstrate manner of capturing of photographs for external surfaces used in texturing methods of the present invention. Close-up photographs of mark region are captured, which includes logo, the written instructions ($i_1$), the words ($w_1,w_2$), drawings, the symbols ($y_1$-$y_5$) and the marks ($m_1$), for bringing out clarity of the mark region. The external surfaces of external parts (p1-p6) of the scooter visible from outside are photographed not only when the parts are fitted and all parts are integrated on the scooter, but also by segregating or separating the individual parts (p1,p2), as shown in different illustrations of FIG. 2. It will be appreciated that although all parts or components may be photographed using different photograph capturing manner to be used for texturing, however for practical use, only those surfaces of external and/or internal parts which are of interest or selected for texturing in the 3D model are photographed using different photograph capturing manner, described above. The surfaces displayed in—or during— different user-controlled interactions in the 3D model are usually the surfaces selected for texturing using photographs, and photographs of such surfaces are captured. As mentioned previously, the user-controlled interactions includes user controlled realistic interactions selected from extrusive interactions, intrusive interactions, time-bound changes based interactions and environment mapping based interactions, and also the interactions performed by a user with a 3D model, where on providing an input by the user, a corresponding response is seen in the 3D model. The response is generated in real-time resulting in change in view of the 3D model.

Figure 2:
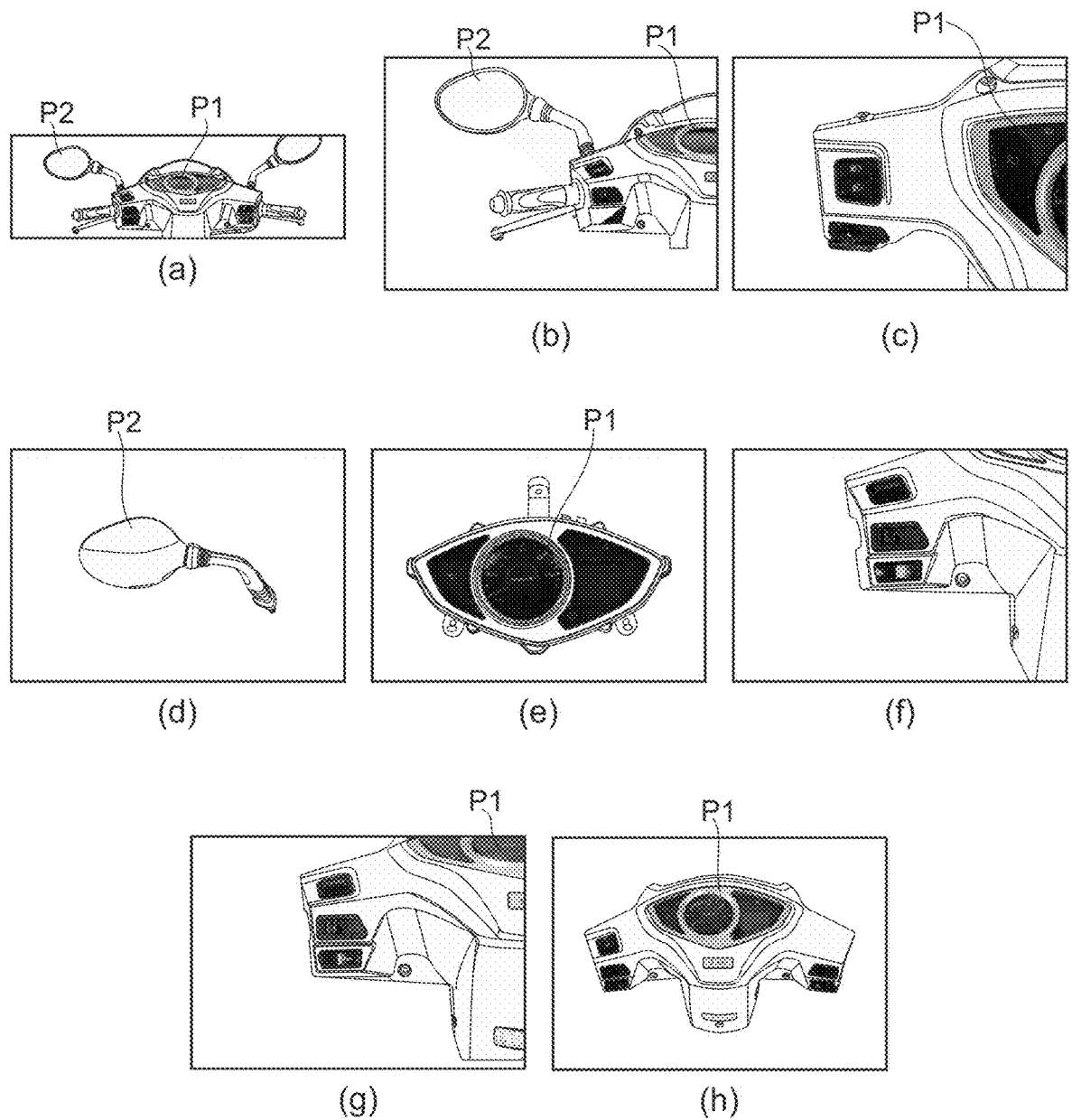
FIG. 2 illustrates, through illustrations (a)-(h), different photographs, shown here in schematic representation, to depict further photographs capturing manners of the external surfaces of the handle and meter portion of the scooter of FIG. 1 in an example used for texturing according to an embodiment of the present invention.

FIG. 2 shows different photographs, shown here in schematic representation in illustrations (a)-(h), to depict further photographs capturing manners of the external parts with the help of the handle and meter portion (101) of the scooter of FIG. 1 in an example used for texturing according to an embodiment of the present invention (not all photographs shown). Illustration (d) of FIG. 2 is a photograph (shown schematically) of dismantled and separated rear view mirror part (p2), and illustration (e) of FIG. 2 is a photograph (shown schematically) of dismantled and separated meter part (p1) of the scooter. Photographing segregated parts enables capturing details of texture of hidden regions or areas of parts, which gets covered or masked when the parts are fitted. An example is shown in FIG. 8, where four different parts (801-804) are shown in fitted position, and where due to fitting or arrangement of the parts, some regions (805) are masked or hidden. The texture of these regions (805) cannot be captured in photographs when in fitted position, and thereby the factual details of texture for the regions are captured when separating or segregating the individual parts (801,802,803,804) from each other.

Figure 3A:
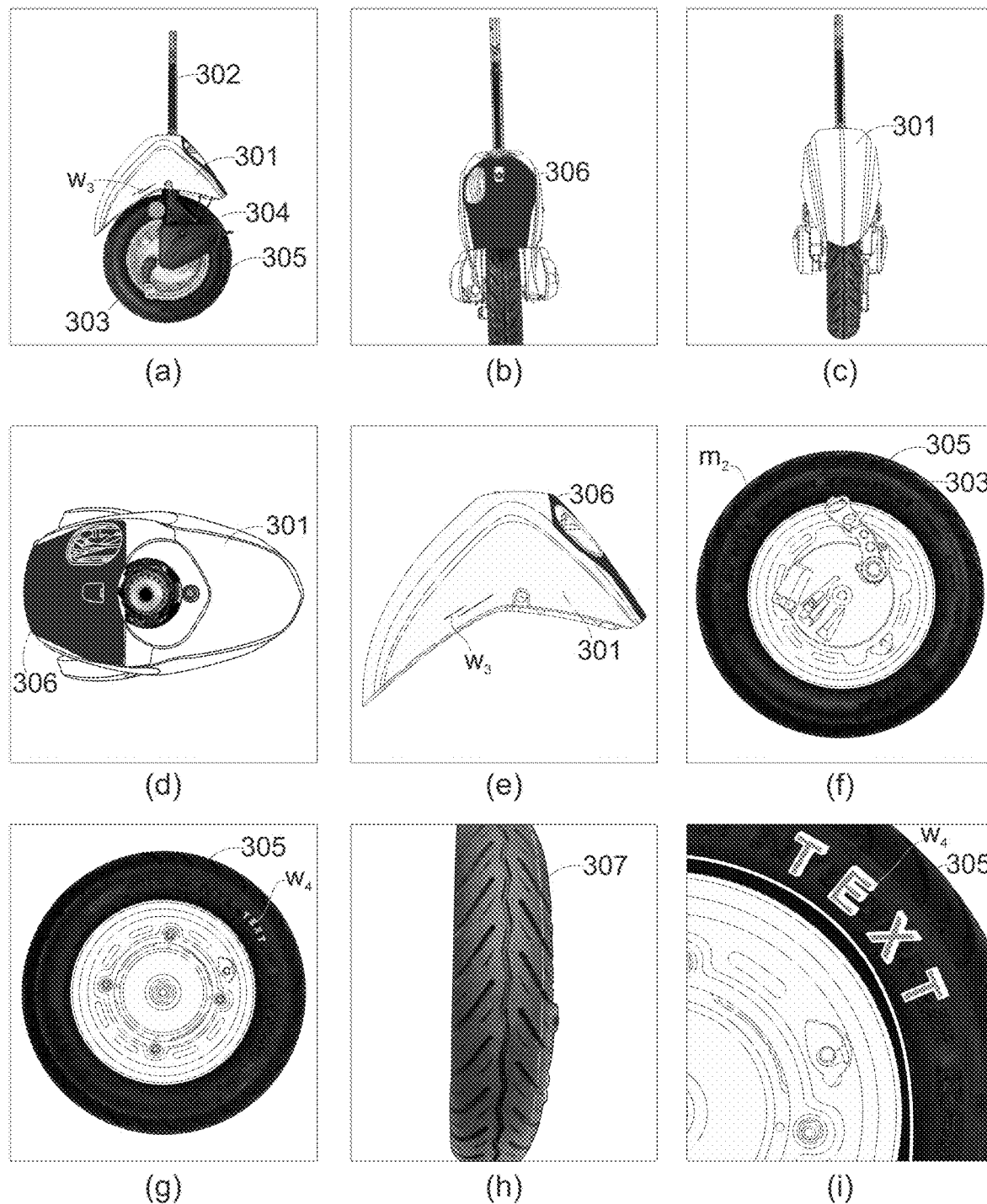
FIG. 3a illustrates, through illustrations (a)-(i), further photographs capturing manner of both external and internal parts for capturing different shades and texture in precise details used in a texturing method according to an embodiment of the present invention.
Figure 3B:
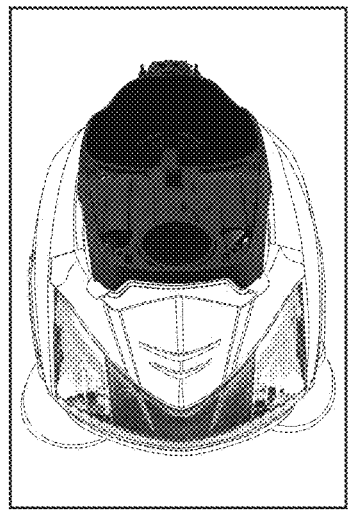
FIG. 3b illustrates, through illustrations (a)-(e), photographs capturing manner of internal surfaces for capturing different shades and texture in precise details used in a texturing method according to an embodiment of the present invention.
Figure 3B:
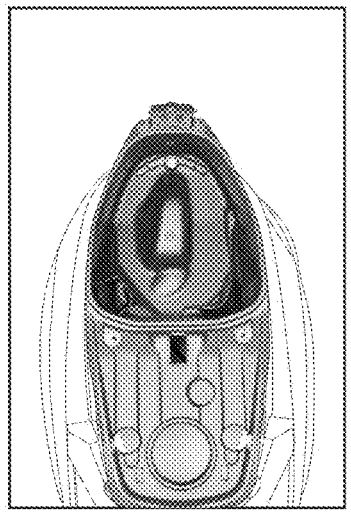
Figure 3B:
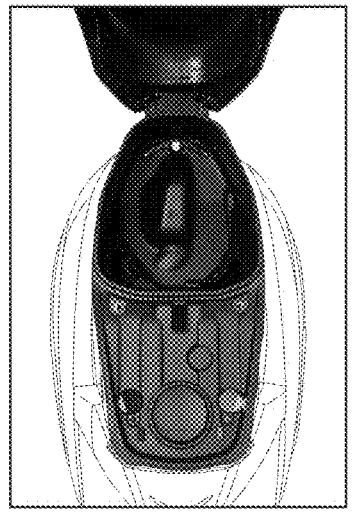
Figure 3B:
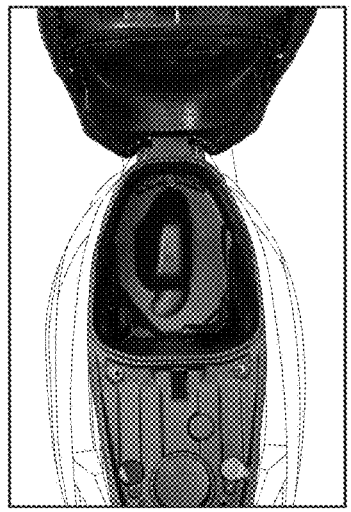
Figure 3B:
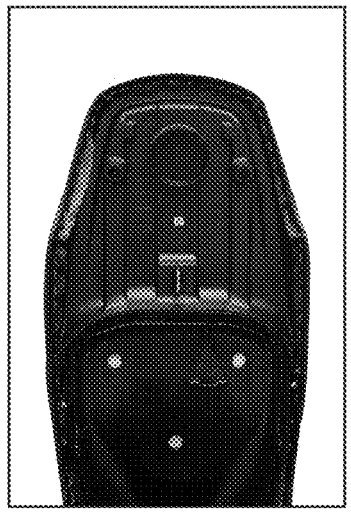

Referring now to FIG. 3a, which shows different photographs, also shown in schematic representation in illustrations (a)-(i), for illustrating further photographs capturing manner of both external and internal surfaces for capturing different shades and texture in precise details used in a texturing method according to an embodiment of the present invention. An internal part (302) of the real 3D object, here scooter, not visible from outer side, is captured and then removed further as seen in illustration (d) of FIG. 3a to capture precise top view of a mudguard part (301) with an internal part holder, and a mudguard covering (306). The mudguard part (301) is completely segregated to capture photographs of the segregated mudguard part (301) as shown in illustration (e) of FIG. 3a. Small sub-parts can also be removed for capturing details such as removal of sub-part (304) to get interrupted view of wheel part (301), and further removal of sub-parts as shown in illustration (f) and (g) of FIG. 3a, where a sub-part (303) is also removed to capture photograph of a wheel part (305). Photographs of all mark region, such as inscribed words ($w_3$), embossed text ($w_4$) or marks ($m_2$) on the wheel part (305) as shown in illustrations (e)(f)(g) and (i) of FIG. 3a are also captured normal to the mark region, by taking a close-up photograph in zoomed manner. Tread (307) of tire is captured as shown in illustration (h) of FIG. 3a, and any further variation in the tread pattern, if exists, then the difference is captured separately. In FIG. 3b, different photographs, also shown in schematic representation in illustrations (a)-(e) of FIG. 3b, for illustrating further photographs capturing manner of internal surfaces and internal parts for capturing different shades and texture in precise details used in a texturing method according to an embodiment of the present invention. Illustration (b), (c) and (d) of FIG. 3b shows captured photographs, in schematic representations, by focusing on different sub-surfaces of the internal surface having different faces. Illustration (e) of FIG. 3b is internal surface of seat part of the scooter.

Inaccessible surfaces of real 3D object, such as interior of fuel tank of an automotive vehicle can also be displayed in some implementation in user-controlled interactions. For such implementation, a flexible means such as pipe camera can be used to capture photographs or video to be used in texturing. Further, the lighting condition or environment during capturing of photographs or video can be under natural light or artificial light, depending on getting best view of the real 3D object for capturing precise details in photographs or video to be used for texturing.

Figure 3C:
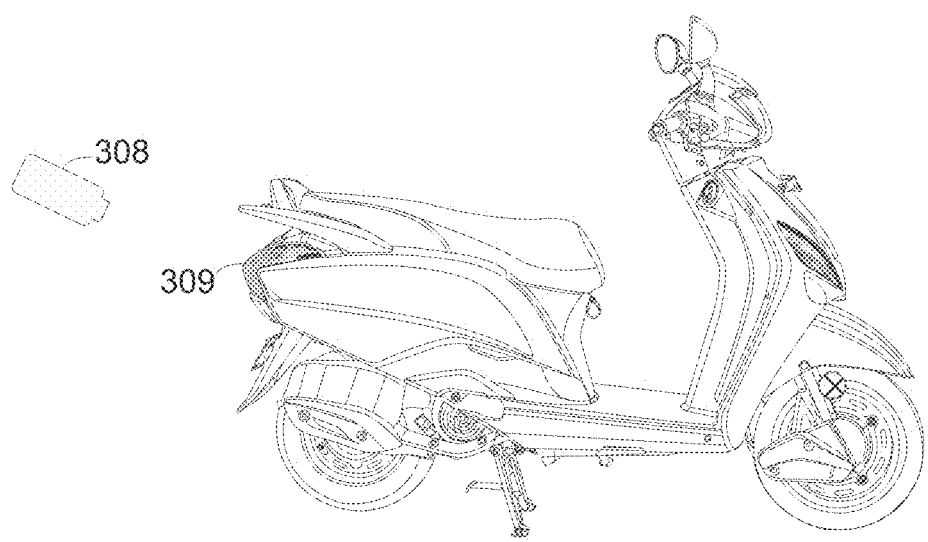
FIG. 3c, illustrates video capturing manner for certain surfaces that are functioning and during their operation according to an embodiment of the present invention.

FIG. 3c, illustrates video capturing manners of external and internal surfaces of real 3D object used in a texturing method according to an embodiment of the present invention. Real 3D objects can have some surfaces which are functioning such as lights, for example as shown by light 309 of scooter in FIG. 3c, digital display etc. For example, to display blinking 309 of light or screen display change of digital meter, video of these functioning surfaces are captured. The video is captured normal to surface of the real 3D object, as shown by 308 which is a video capturing device which is kept in normal to surface 309 and capturing the surface 309, while the surface is in operative state and functioning. Capturing video of such functioning surfaces provides real visual rather than providing such visual by animation. The captured video can be used as a texture data and applied on the 3D-model on a particular surface which corresponds to operative state in real 3D model.

It is to be understood that although video are captured for functional surfaces preferably, however in some implementation, video can be captured for other surfaces (other than functioning) same as that of photograph capturing manner, and in such implementation or cases, only images obtained from videos may be used in texturing methods of the present invention, instead of capturing photographs directly, as images obtained from video are also factual and retain precise details.

Figure 4:
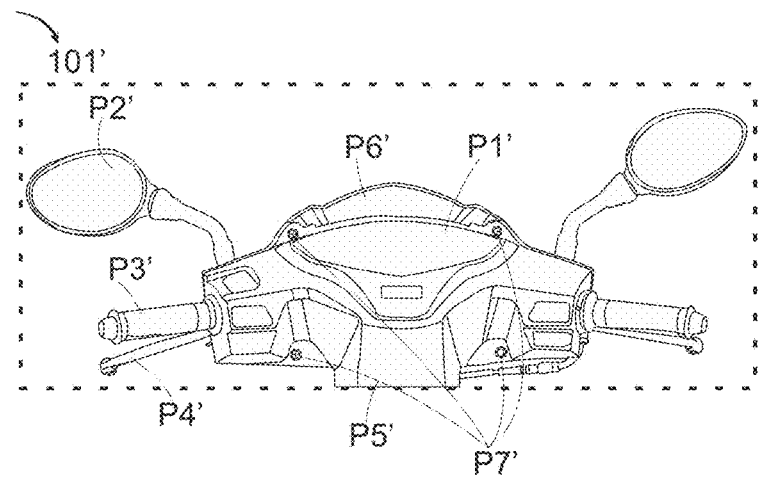
FIG. 4 illustrates selecting one or more surfaces of one or more external and/or internal parts of a 3D model in an example.

Referring now to FIG. 4, which illustrates a portion of a 3D-model depicting selection of one or more surfaces of one or more parts of a 3D-model for carrying out UV unwrapping of the selected surface/s of the 3D model. The 3D model is a 3D computer graphics model on which user-controlled interactions are applied or in other words on which the user-controlled interactions can be programmed, so as to make the 3D model interactive to users' input. The surfaces of a handle and meter portion (101') of the 3D model (entire 3D model not shown), are selected for further processing.

Figure 5:
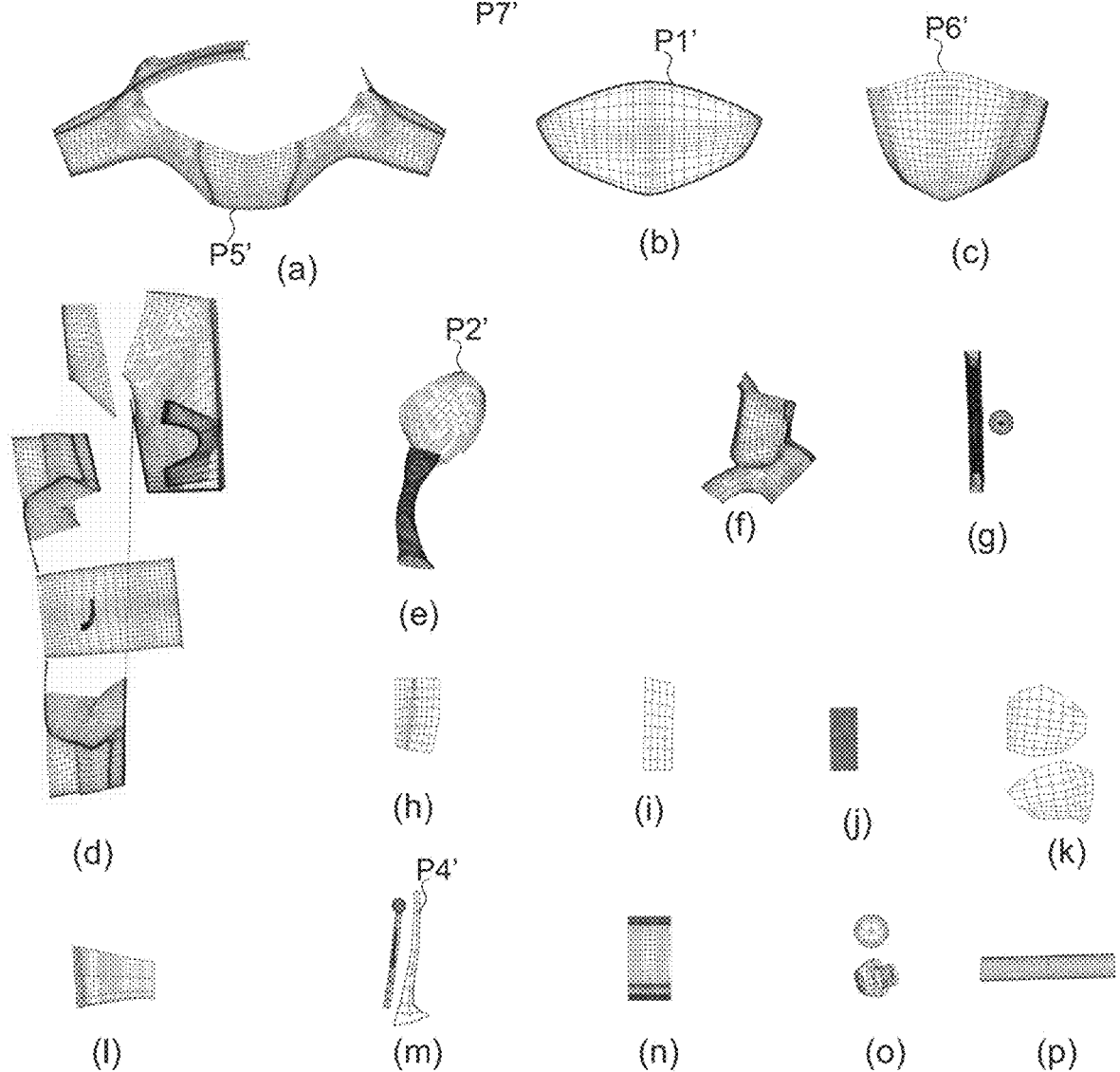
FIG. 5, through illustrations (a)-(p), illustrates in an example UV unwrapping for generating UV layout of each selected surface/s of FIG. 4, according to an embodiment of the present invention.

In FIG. 5, through illustrations (a)-(p), different UV layouts of selected surfaces of the FIG. 4 of different parts, according to an embodiment of the present invention, is illustrated. UV unwrapping of the selected surfaces of the 3D model can be carried out using standard technique. However the entire 3D model is not unwrapped as a whole, and a single UV layout is drawn for each selected surface or part of the 3D model. The selected surfaces in this example contains multiple parts, both external and internal parts such as a meter part (p1'), a rear mirror (p2'), brakes, a handle cover part (p3'), a hand brake part (p4'), a meter-case part (p5'), a front guard (p6'), a screw part (p7') and other chosen sub-parts is UV unwrapped at a time for generation of UV layouts. In FIG. 5 illustrations, the illustration (a) shows a UV layout for the meter-case part (p5'), the illustration (b) shows a UV layout for the meter part (p1'), illustration (c) shows a UV layout for the front guard (p6'), illustration (d) shows multiple UV layouts for a part of front guard (p6'), a rear handlebar cover part, and a portion of covering, illustration (e) shows a UV layout for the rear mirror (p2'), illustration (f) shows a UV layout for another portion of handlebar covering part, illustration (g) shows a UV layout for the screw part (p7'), illustration (m) shows a UV layout for the hand brake part (p4'). Similarly illustrations (h)-(l) (n)(o)(p) of FIG. 5 represent UV layout of sub-surfaces of different parts.

The different photograph and video capturing manners in addition to obtaining a single UV layout makes possible easy and precise alignment of photograph and/or video for the particular face in distortion free manner in the first alignment attempt itself saving texturing time, while avoiding any loss of details during alignment of photographs or video. Further a check of distortion is also carried out, to see if any photograph if captured slightly away from normal is distorted, and where a distortion, if any is found, a calibrated technique is used as discussed in FIG. 9 and FIG. 10 to make the application of photographs and/or video completely distortion free, and retaining exact texture of photographs and/or video. In an alternative embodiment, an exterior UV canvas and an interior UV canvas can be drawn or generated, where the exterior UV canvas comprises UV layouts for chosen external surfaces and the interior UV canvas comprises UV layouts for chosen internal surfaces. It should be understood that the UV unwrapping may be any type UV unwrapping known to one having ordinary skill in the art. The present invention should not be deemed as limited to a specific embodiment of UV unwrapping and/or drawing/generation of UV layouts.

Figure 6:
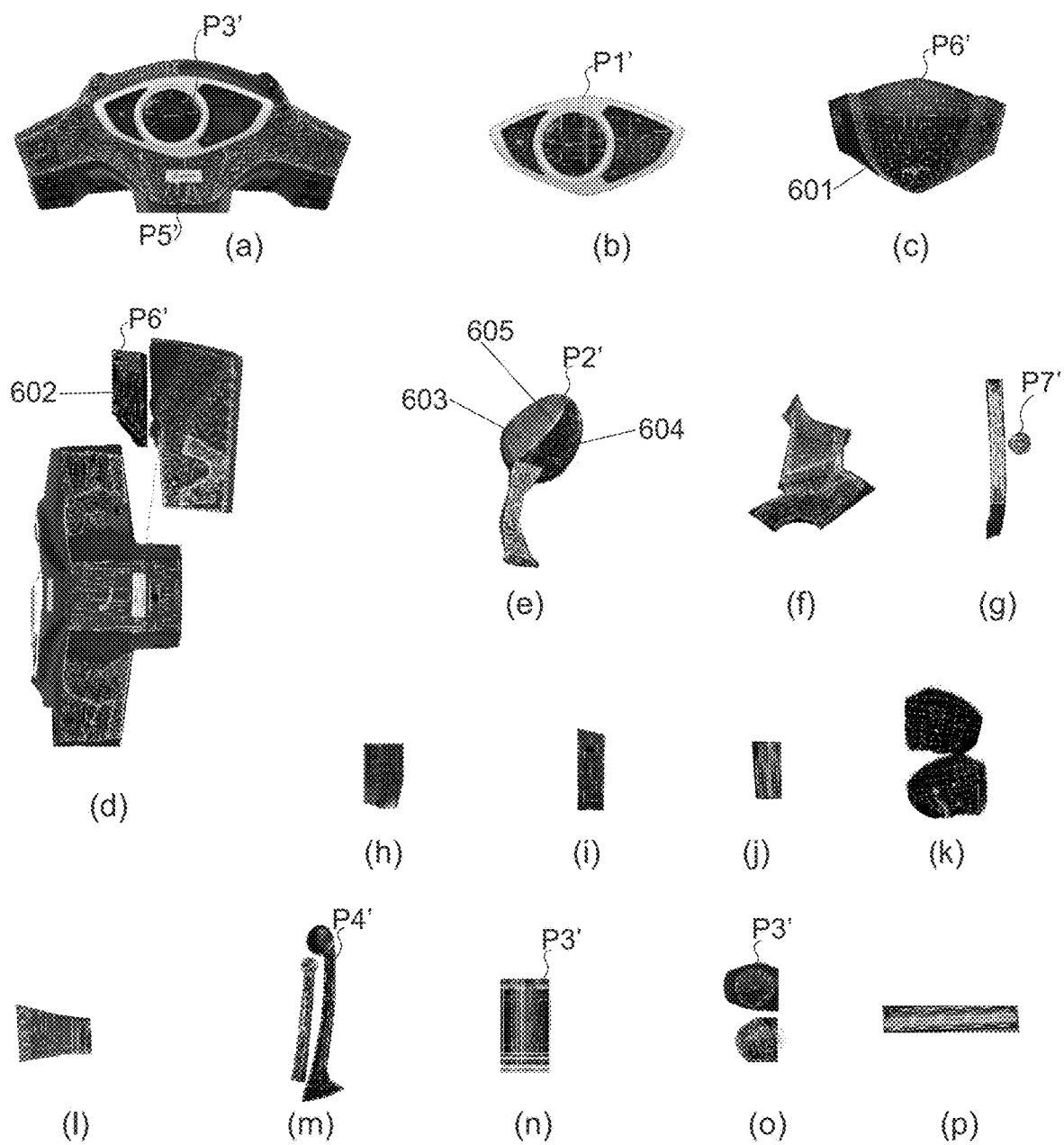
FIG. 6, through illustrations (a)-(p), illustrates in an example application of one or more photographs on each corresponding UV layout of FIG. 5, according to an embodiment of the present invention.

Now referring to FIG. 6, which illustrates in an example, through illustrations (a)-(p), generation of texture by application of each photograph and/or video on corresponding UVs of the UV layouts of FIG. 5, joining of UVs of different surfaces to make texture of selected surfaces of different parts of the handle and meter portion (101'), while performing different calibrations of photographs and/or video during application according to an embodiment of the present invention. The photograph/s and/or video of a part or surface to be applied on corresponding UV layout for the part is/are identified among different photographs and/or video. The identified photographs for each part as shown in the illustrations (a)-(c)(f)-(h) of FIG. 2 for meter-case part (p5) in one example are applied on the corresponding UV layout (p5') of the meter-case part as shown in illustration (a) of FIG. 5. The photographs as shown in the illustrations (e) and (h) of FIG. 2 for meter part (p1) are applied on UV layout (p1') of the meter part as shown in illustration (b) of FIG. 5. One UV layout can have multiple textures for one or more surfaces in the 3D model. In one implementation, one or more UV layout such as the UV layout (p1') can have textures obtained from just video. In another implementation, one or more UV layout such as the UV layout (p1') can have textures of both photograph and video. The application of identified photographs and/or video on corresponding UVs of corresponding UV layouts, is followed by joining of the UVs of adjacent surface with calibrated texture or in other words joining of the UVs of related UV layout having calibrated texture, as shown in illustration (a) of FIG. 6, where UVs of the meter-case part (p5') and the meter part (p1') are joined. Similarly, after application of photographs and/or video, the UVs of different surfaces of adjacent parts with calibrated texture are joined. For example, UV layout of different surfaces of hand brake receiving part, as shown in illustration (k) of FIG. 6, a front neck part (703) as shown in FIG. 7b and corresponding UV layout as shown in illustration (l) of FIG. 6, and UV layout of the rear handlebar cover part (p5') as shown in illustration (d) of FIG. 6, side face (701) of the front guard part (p6') as shown in FIG. 7a, and corresponding UV layout of the side face (701) of front guard part (p6'), as shown in illustration (d) of FIG. 6 and FIG. 7a, are joined with calibrated texture as shown in FIG. 7c. One or more UV layout can be drawn for single part depending on number of faces, angle between adjacent faces, and number of mark region on each part. For example, as shown in FIG. 7a, the front guard part (p6') of the 3D model have two distinct faces (701,702) and a mark region of written words (w₅). Therefore, three different UV layouts are drawn to align captured photographs and/or video (not shown) easily and additionally retain factual details of the texture of captured photographs and/or video. As both the captured photographs and/or video are taken normal to a face, and as also corresponding UV layouts are drawn normal to the face, the application of photographs and/or video becomes quick and distortion free. In cases, where small distortion is observed due to photographs and/or video being slightly deviated from normal, different calibration techniques are used during application of photographs and/or video on UV layout for rectification of distortion and other artificial artifacts, if any. Another Calibration can be done during joining of UVs of related UV layouts.

Figure 9:
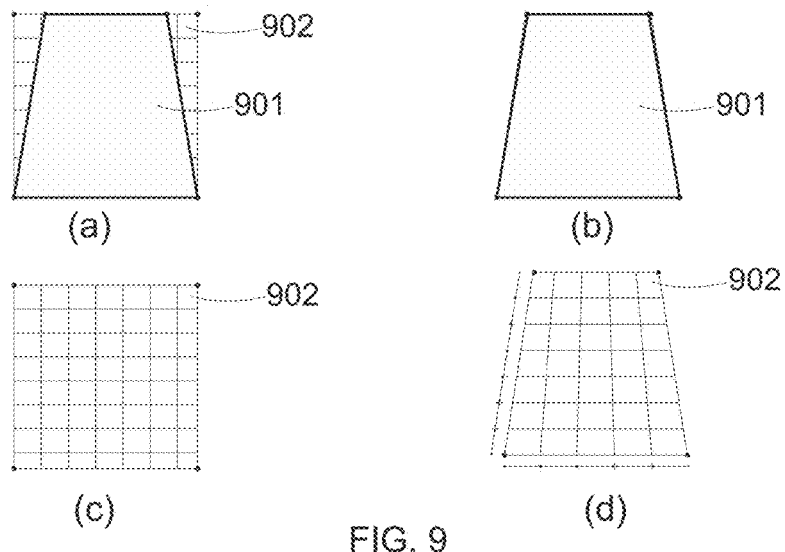
FIG. 9, through illustrations (a)-(d), illustrates a calibration technique of photographs with UV layout in an example during application of photographs on each UV layout, according to an embodiment of the present invention.

In FIG. 9 a calibration technique of photographs with UV layout in an example according to an embodiment of the present invention, is illustrated through illustrations (a)-(d). Illustration (c) of FIG. 9 shows a UV layout mesh (902) drawn normal to a surface before calibration, whereas illustration (d) of FIG. 9 shows the UV layout mesh (902) after calibration. During application of single photograph (901) (either individual photograph or photographs of different faces of same part merged to become single photographic image), the edges of the photographic image (901) are matched with edges of the UV layout mesh (902) as shown in illustration (a) of FIG. 9. The photograph shown here is captured slightly deviated from normal to the surface, and thus during application the photographic image on the UV layout mesh (902), a perfect alignment may not occur in first attempt. If this application is left untouched, or the photograph is stretched, a distortion may result in, or factual details may be lost. Therefore, the UV mesh is calibrated automatically to first match with the edges of applied photograph as shown in illustration (b) of FIG. 9, and then each boundary points of the UV mesh layout (902) at each side of the boundaries are made equidistant with other points for the side, removing distortion easily and quickly without the loss of any details, as shown in illustration (d) of FIG. 9. In case, where a UV layout for an individual segregated part consists of two faces, for which two photographs can be captured for each face. Then the two photographs are joined to single photographic image in joining calibration, where the junction of two photographs corresponds to the junction of two faces of the individual segregated part. For example, in illustration (e) of FIG. 6, the rear view mirror part (p2') have two faces (603,604) which are not very distinct. One photograph of one face (601) is joined with photograph of other face (603) at the face junction (605), and then aligned or applied on the UV layout of the rear view mirror part (p2'), which helps avoiding artificial artifacts, and retaining factual details without any additional calibration.

However, if the angle between two faces is distinct or prominent, more than one UV layout is created for even one segregated individual part. For example, as shown in FIG. 7a, where the front guard part (p6') of the 3D model have two distinct faces (701,702) and a mark region of written words (w₅), as explained above. Now, coming to illustration (c) and illustration (d) of FIG. 6, to show the two UV layouts (601,602) are created for the two distinct faces (701,702) of the front guard part (p6') as shown in illustration (c) and illustration (d) of FIG. 6.

Figure 10A:
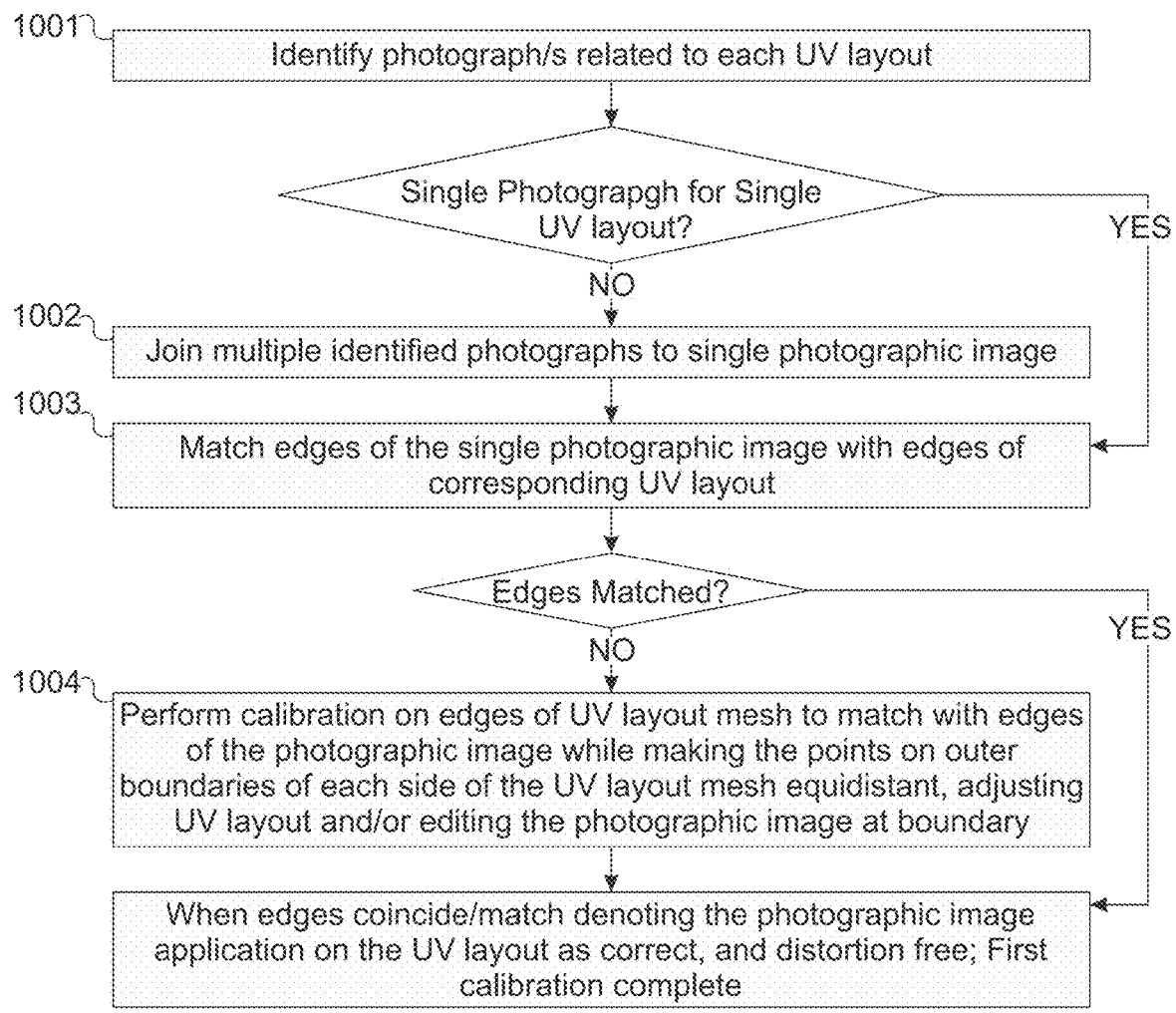
FIG. 10a illustrates a calibration technique of photographs and UV layout in an example according to an embodiment of the present invention.

Now referring to FIG. 10a, a calibration technique of photographs and UV layout in an example according to an embodiment of the present invention, is illustrated. First, identification of photograph/s related to each UV layout is carried out (1001). If a single photograph is identified for a UV layout, then edges of the single photographic image are matched with edges of corresponding UV layout (1003), else if two or more photographs are identified for single UV layout, the photographs are first joined at the junction, particularly face junction (1002), as described above in an example, and then proceeds to matching of edges. Edges usually matches as the photographs captured are normal to faces of surface of external and internal parts, and the UV layout are also drawn normal to the surface of external and internal parts, making application of photographic image on UV layout correct, and distortion free automatically reducing human efforts. However, in cases where for some cases when photograph is captured slightly deviated from normal to the surface, a calibration is carried out on edges of UV layout mesh to match with edges of the photographic image, where the points on outer boundaries of each side of the UV layout mesh are made equidistant to each other (1004), as described in FIG. 9. Additionally, UV layout mesh can be adjusted or the photographs can be edited by photo-editing at boundary for aiding in alignment. The step 1004 makes the photographic image application on UV layout correct, and distortion free, marking completion of first calibration.

Figure 10B:
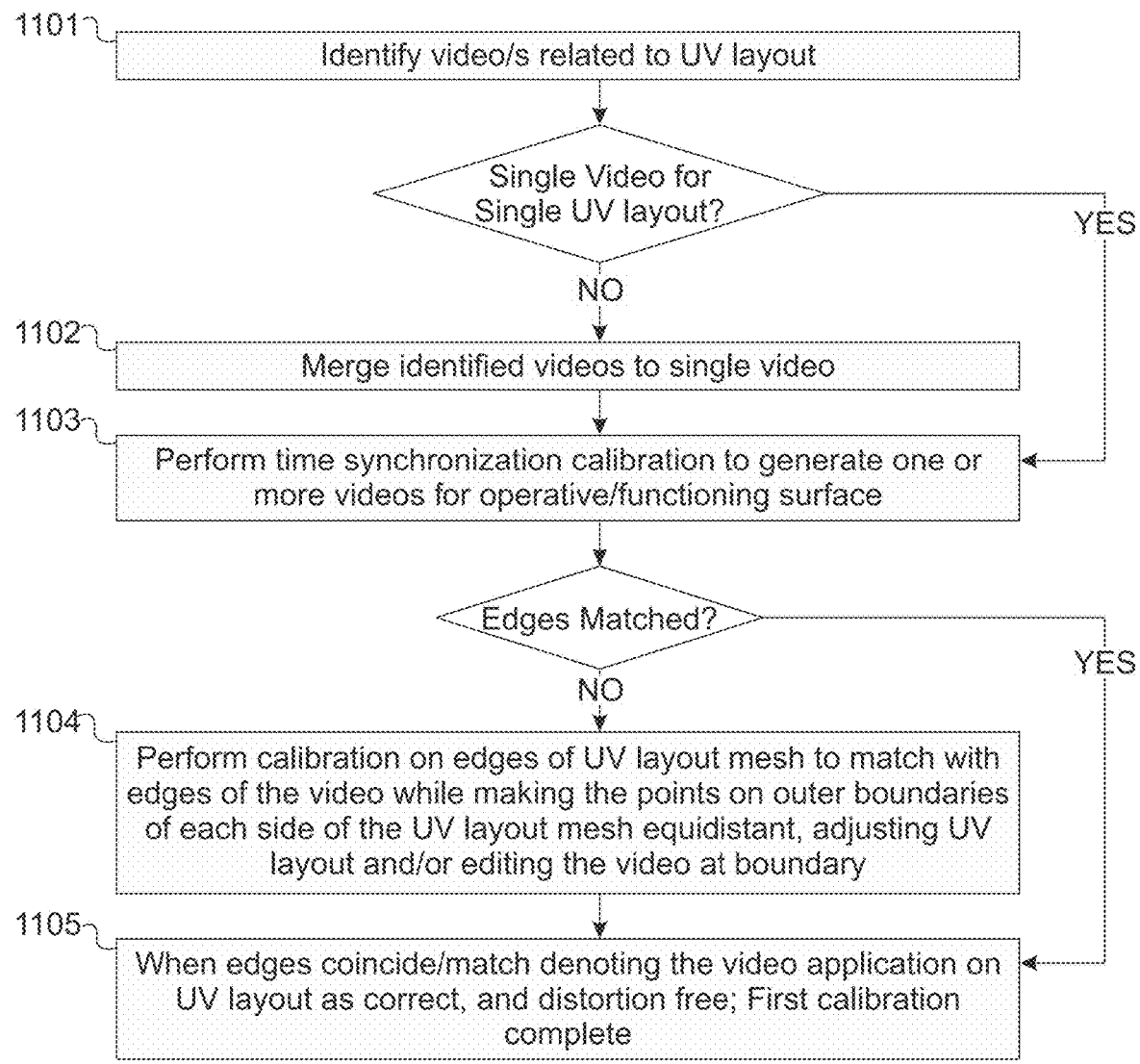
FIG. 10b illustrates a calibration technique of video and UV layout in an example according to an embodiment of the present invention.

Now referring to FIG. 10b, a calibration technique of video and UV layout in an example according to an embodiment of the present invention, is illustrated. First, identification of video/s related to each UV layout is carried out (1101) for functioning surfaces, that is video is used as a texture in the 3D model for surfaces corresponding to functioning parts in real object, and for surfaces whose texture changes dynamically during operation of the functioning parts or surfaces. If a single video is identified for a UV layout, time synchronization calibration is carried out to generate one or more videos for functioning surfaces (1103). Time synchronization involves adjusting time intervals and/or editing of video. In some scenario, two or more videos may be captured from different fields of view to cover the entire functioning surface as single video cannot be captured of a functioning surface that is either curved or have surface area beyond the coverage of one field of view of the camera for covering the entire functioning surface. If two or more videos that are captured from different fields of view of a certain functioning surface for a UV layout, are identified, then merging the identified videos to obtain a single video for the entire functioning surface is carried out (1102), while performing time synchronization to match or synchronize image frames of the captured videos by video editing. For example, if a surface such as rear light of a car is a curved surface (functioning surface) for which it is difficult to take/capture video from one field of view, two or more videos may be captured from two to three fields of view. In such scenario, two or more videos may be merged to single video to apply on a UV layout for the curved surface. Here, merging means using time synchronization to match/adjust or synchronize image frames of the videos captured from different field of view by photo/video editing such as to generate one video applicable on the UV layout of the curved surface. Another example can be a long surface (functioning surface with large surface area) where it becomes difficult to capture a single video normal to surface or a close-up video without changing the field of view of the camera lens. In such scenario too, two or more videos, captured to cover the entire length of the surface, may be merged to single video to apply on a UV layout for the long surface by video editing while synchronize image frames of the videos captured for long surface. Functioning surface means surface of functioning parts in real/physical 3D object that are operative such as automotive vehicle lights (rear lights, head lights, to show blinking, ON-OFF etc.). Again, for some cases when video is captured slightly deviated from normal to the surface, a calibration is carried out on edges of UV layout mesh to match with edges of the video, where the points on outer boundaries of each side of the UV layout mesh are made equidistant to each other (1104), same as that described in FIG. 9 for photographs. Optionally, UV layout mesh can be adjusted or the video can be edited at boundary. Now, on coinciding or matching of the edges of UV layout mesh with the corresponding video, applying of the video on the UV layout is denoted as correct, and distortion free; and proceeding to next UV layout is carried out (1105).

Another calibration is carried out during joining of UVs of related UV layout to form texture. During joining of UVs of different surfaces, visible artifacts are very minimum, and joining of UVs of different surfaces is easier due to previously performed first calibration. However, a check is carried out for any visible artifacts such as seams, and visible artifacts if any observed are corrected by further adjustment of UV layout mesh boundaries and photographs and/or video. An editing of photographs at boundary can also be carried out. Clone patching of edges can also be used to remove seams using conventional techniques. During calibration, more pixels are allocated to the mark regions in comparison to other regions or surfaces of comparatively uniform structure to bring out clarity and vividness and remove blurring of small marks. As separate UV layout is drawn for each mark region, the pixel allocation is simplified.

Figure 11:
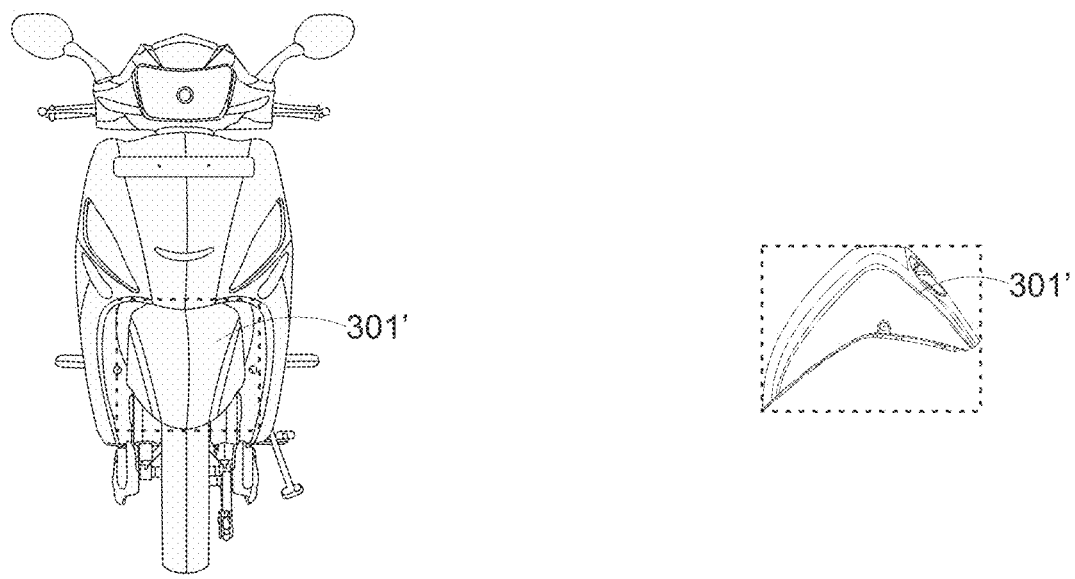
FIG. 11 illustrates selecting another surfaces of the 3D model in an example of a 3D model according to an embodiment of the present invention.
Figure 12:
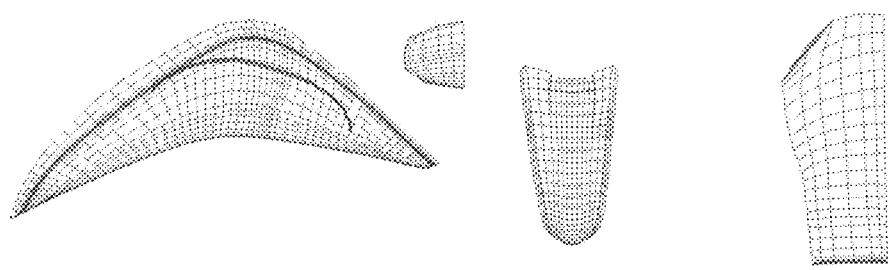
FIG. 12 illustrates in an example UV unwrapping of the selected surfaces of FIG. 11 for generating UV layout for each selected surfaces, according to an embodiment of the present invention.

FIG. 11 illustrates selecting another surface of the 3D model in an example of a 3D model, for generating UV layout for each selected surfaces according to an embodiment of the present invention. Here, surfaces of front mudguard part (301') are shown selected for disintegration of the part (301') from the 3D model of scooter. Four UV layouts are created for different texture on the front mudguard part (301'), as shown in FIG. 12. In FIG. 12, the front mudguard part (301') selected in FIG. 11 is unwrapped or flattened with drawing/generation of UV layouts of each chosen/selected surfaces. The above process of identifying photograph/s corresponding to each UV layout, applying identified photograph/s on each UV layout, joining all UVs of related UV layouts with calibrated texture to form texture for the selected surface/s, while performing another calibration, applying calibrated texture on the 3D model in said selected surfaces of the 3D-model, are carried out for texturing.

Figure 13:
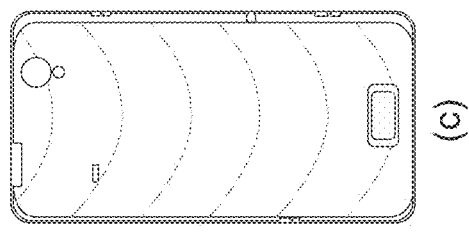
FIG. 13, through illustrations (a)-(g), illustrates different schematic views of a textured 3D-model of mobile depicting textured chosen external and internal surfaces of outer and inner parts in one example using photographs of a mobile (a real 3D object), according to an embodiment of the present invention.
Figure 13:
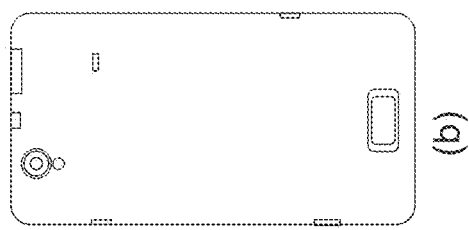
Figure 13:
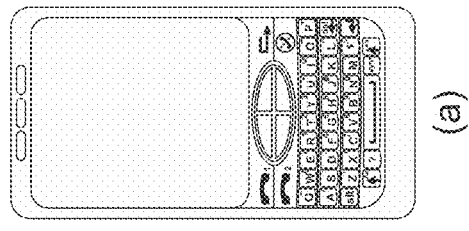
Figure 13:
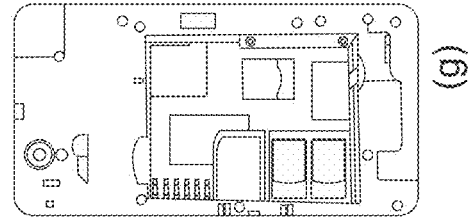
Figure 13:
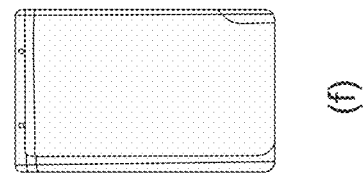
Figure 13:
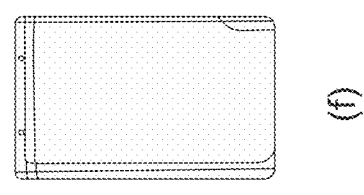
Figure 13:
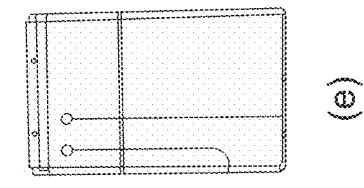

In FIG. 13 different schematic views of a 3D-model of mobile depicting external and/or internal surfaces textured using real photographs and/or video of 3D object mobile, according to one embodiment of the present invention, is illustrated, through illustrations (a)-(g). Illustration (a) of FIG. 13 shows different operable sub-parts viewed from outside such as display, keys and body. As mark region of symbols and alphabets appear on each keys on mobile, photographs or videos and UV layout are obtained separately for each key. The UVs of each UV layout of keys, display and body are joined after application of photographs and/or video to form texture for the front view of 3D model of mobile, as shown in illustration (a) of FIG. 13. The creation of separate UV layout for texturing of each key makes the mark region on each key very clear and real, such that on zooming the 3D-model, the symbols and alphabets do not get blurred.

Illustration (b) shows schematically external surface of an external part that is outer side of battery cover, which is textured by a texturing method of the present invention. Illustration (c) shows internal surface that is inner side of battery cover, which is textured by a texturing method of the present invention. Illustration (d)-(g) of FIG. 13 shows interior of mobile, surfaces of internal parts and SIM slot positioned beneath mobile battery. All the visible surfaces observed during intrusive interaction of opening of parts of 3D mobile one by one in an user-controlled realistic interaction as shown in illustration (a)-(g) of FIG. 13, are textured by the texturing method of the present invention.

Figure 14:
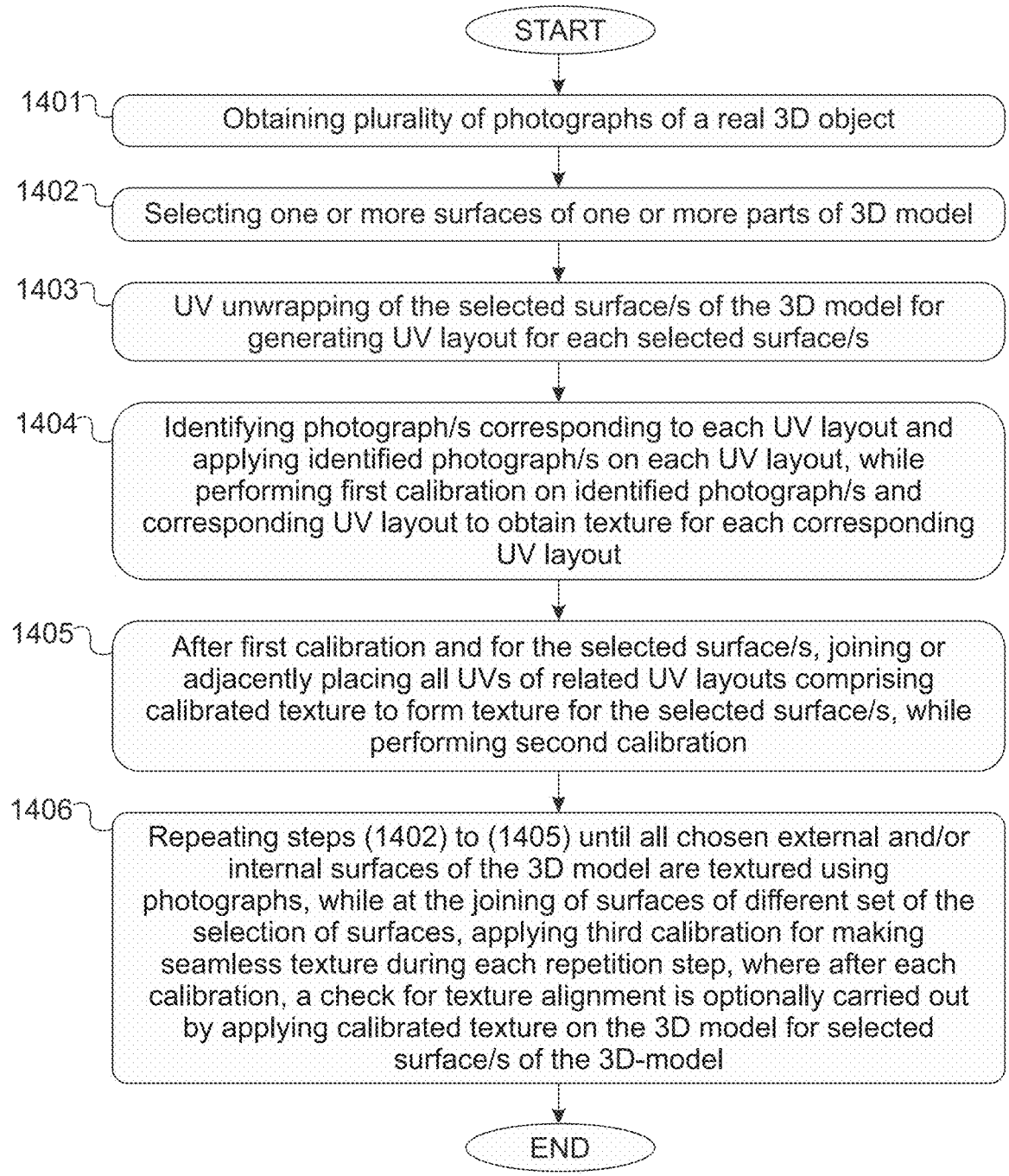
FIG. 14 illustrates a flowchart of a method for texturing on external and/or internal surfaces of a three-dimensional (3D) model of a real 3D object using photographs of the real 3D object, according to an embodiment of the present invention.

FIG. 14 illustrates a flowchart according to an embodiment of the present invention of a texturing method for external and/or internal surfaces of a three-dimensional (3D) model of a real 3D object using photographs of the real 3D object. The texturing method involves obtaining plurality of photographs of chosen external and/or internal surfaces of the real 3D object (1401) by different photograph capturing manners. The different photograph capturing manners are discussed in FIG. 1, and further in FIG. 2, FIG. 3a and FIG. 3b. At step 1402, one or more surfaces of one or more parts of the 3D model is/are selected. The selection of the surfaces is discussed by way of example in FIG. 4, where the surfaces of different parts in the handle and gauge portion (101') of the 3D model is selected in an example. The chosen/selected external and/or internal surfaces are usually external and/or internal surfaces of external and/or internal parts displayed in—or during—different user-controlled interactions. At step 1403, UV unwrapping of the selected surface/s of the 3D model for generating UV layout for each selected surface/s takes place. The UV layouts generation or drawing depends on angle between adjacent faces, and number of mark region on each unwrapped part. A separate UV layout is preferred for each mark region such as logo, words, marks, symbols etc. The drawing or generation of one or more UV layout for each selected surface is explained in an example in FIG. 5, and FIG. 7*a*. At step 1404, photograph/s related to each UV layout are identified, and applied on each UV layout. A calibration is carried out on identified photograph/s and UV layout using a calibration technique of photographs with UV layout as described in FIG. 10*a* and FIG. 9 to obtain texture for each corresponding UV layout. The texture obtained in this step is calibrated texture of real photographs which aligns accurately with the corresponding surfaces of 3D model. At step 1405, after calibration is done, joining all UVs of related UV layouts with calibrated texture to form texture for the selected surfaces is carried out. Meanwhile, further calibration of photographs with UV layouts is carried out, which includes performing a check for visible artifacts. And if visible artifacts are identified, the UV layout mesh boundaries and photographs are adjusted. The pixel allocation for the mark region is calibrated separately for resolution such that the texture of the mark region is clear and vivid, and relatively more pixels are assigned to the mark region. Photographs can be joined seamlessly during second and third calibration by means of photo-editing using conventional techniques. The editing or photo-editing means editing of real photographs to enhance the photographs quality, cropping photographs, obtaining texture patch from the photographs for clone patching, tiling etc. Step 1406, involves repeating steps 1402-1405 until all chosen external and/or internal surfaces of the 3D model are textured using photographs, while at the joining of surfaces of different set of the selected surfaces, applying third calibration for making seamless texture during each repetition step takes place. In one embodiment, a check for texture alignment may be carried out after each calibration, by applying calibrated texture on the 3D model for selected surface/s of the 3D-model. Each UV point in UV layout corresponds to one x,y,z coordinate in the 3D model. The final calibrated textures and corresponding 3D-model is stored as texture data and 3D-model data respectively. This step provides the 3D model data and corresponding calibrated texture data obtained in repetition step 1406 to implement user-controlled interactions to transform the 3D model data with calibrated texture data into an interactive 3D model for performing user-controlled interactions. The calibrated textures and corresponding 3D-model obtained are used for displaying real-like textures on a 3D-model which is used for user-controlled interactions, as discussed in FIG. 19.

In an alternative embodiment, one selected part surfaces of the 3D-model can be UV unwrapped at a time for creating one or more UV layout, followed by application of photograph for each UV layout, while performing first calibration of photographs with the UV layout. This is followed by unwrapping of second selected part's surface for creating one or more UV layout for the second part's surfaces. This embodiment may be employed for 3D models containing a few external and/or internal parts, or when an individual part contains very complex geometry with multiple faces, textures etc. Texturing of certain external and/or internal surfaces in the 3D model, such as surfaces having single colour, surfaces containing uniform texture can be textured using colour, or combination of colour and textures obtained by photo-editing of real photographs.

Figure 15:
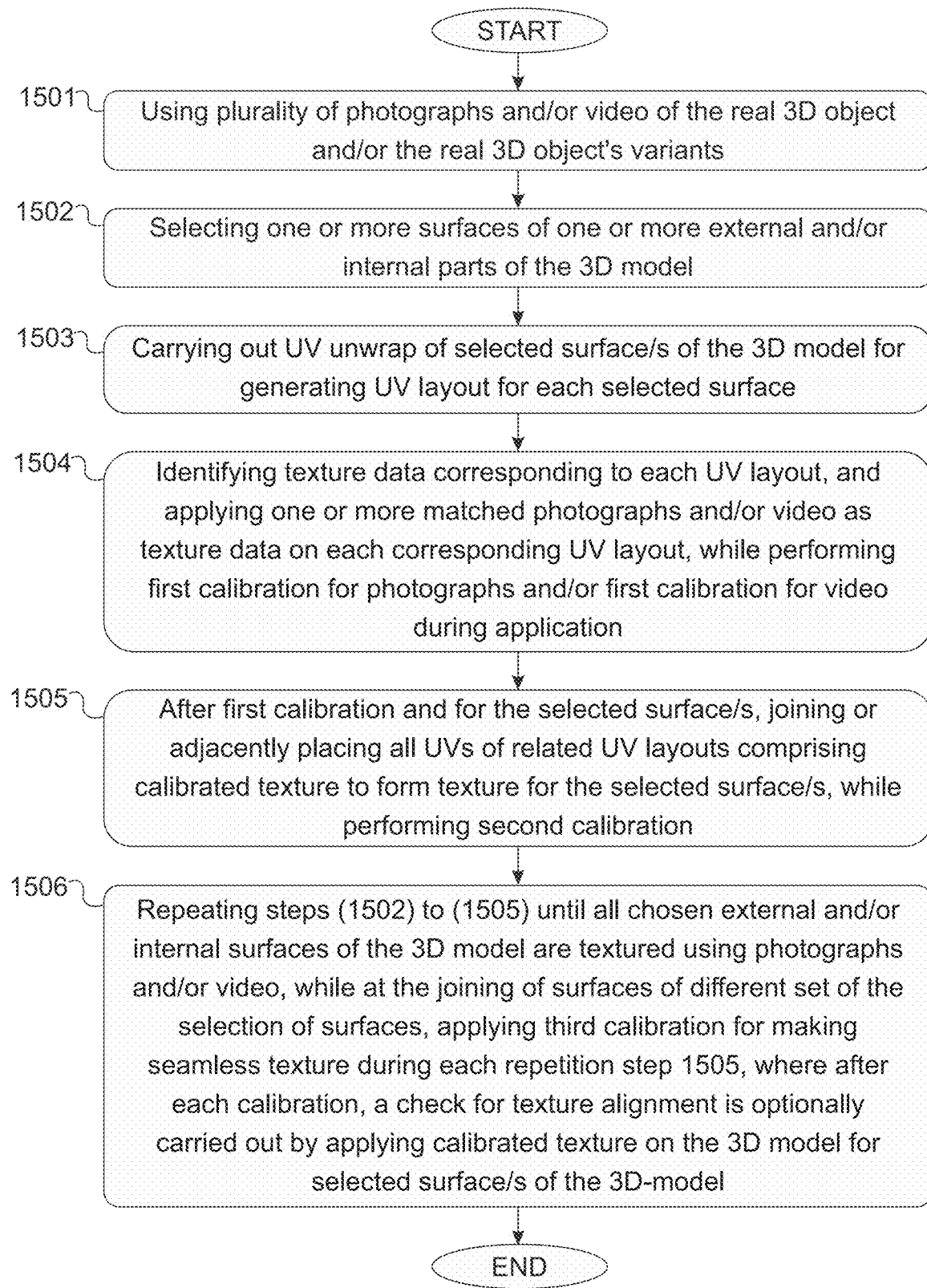
FIG. 15 illustrates a flowchart of a method for texturing of a 3D-model using photograph and video, according to another embodiment of the present invention.

FIG. 15 illustrates a flowchart of a texturing method of a three-dimensional (3D) model of a real 3D object using photograph and video, according to an embodiment of the present invention. At step 1501, obtaining and using plurality of photographs and/or video of the real 3D object and/or the real 3D object's variants is carried out. The photographs and/or video are used as texture data. The real 3D object's variants have same shape as of the real 3D object. Each real 3D object's variant contains at least one texture, pattern or mark region different from the real 3D object qualify for variant. The different photograph capturing manners are discussed in FIG. 1, and further in FIG. 2, FIG. 3*a* and FIG. 3*b*. The video capturing manner is discussed in FIG. 3*c*. The photographs and videos are captured by a photograph and video capturing device, preferably a digital camera configured for capturing high resolution photographs and video.

Step 1502 involves selecting one or more surfaces of one or more external and/or internal parts of the 3D model. The selection of the section is discussed by way of example in FIG. 4. The surfaces selected for texturing are usually the external and/or internal surfaces, which are to be displayed in—or during—different user-controlled interactions.

At step 1503, UV unwraps of selected surface/s of the 3D model for generating UV layout for each selected surface is carrying out. The drawing or generation of one or more UV layout for each selected surface is explained in an example in FIG. 5, and FIG. 7*a*.

Step 1504 involves identifying texture data corresponding to each UV layout, and applying one or more matched photographs and/or video as texture data on each corresponding UV layout. Different calibrations on photographs and video are carried out during application, as described in FIG. 10*a* and FIG. 10*b* respectively. Calibration includes adjusting UV layout mesh to make points on outer boundaries of each side of the UV layout mesh equidistant. Additionally, editing of photograph/s at boundary can be carried out for aiding in alignment.

Step 1505 involves joining all UVs of related UV layout to form texture for the selected surface/s. Here, UV layout comprises calibrated texture. Here, further calibration is carried out during joining. During joining of UVs of different surfaces, a check is carried out for any visible artifacts such as seams, and visible artifacts if any observed are corrected by further adjustment of UV layout mesh boundaries and photographs and/or video. Clone patching of edges can also be used to remove seams using conventional techniques. During this calibration, more pixels are allocated to the mark regions in comparison to other regions or surfaces of comparatively uniform structure to bring out clarity and vividness and remove blurring of small marks. As separate UV layout is drawn for each mark region, the pixel allocation is simplified.

Step 1506 involves repeating steps 1502 to 1505 until all selected/chosen external and/or internal surfaces of the 3D model are textured using photographs and/or video, while at the joining of surfaces of different set of the selection of surfaces, third calibration is applied for making seamless texture during each repetition step 1506. A check for texture alignment is optionally carried out after each calibration, by applying calibrated texture on the 3D model for selected surface/s of the 3D model. The view of texture on the textured 3D model replicates view of texture as on the real 3D object for the selected external and/or internal surfaces. The final calibrated textures and corresponding 3D model is stored as texture data and 3D model data respectively. The calibrated textures and corresponding 3D-model obtained are used in user-controlled interactions implementation. The calibrated textures and corresponding 3D-model obtained are used for displaying real-like textures on a 3D-model which is used for user-controlled interactions, as discussed in FIG. 19.

The texture data optionally comprises texture made by photo-editing of real photographs and/or videos, images other than photographs; or artificial colour. Even if images other than photographs can be used, use of photographic images in total UV layouts for texturing ranges from 10-100% of total number of images optionally used in texturing in all cases. In other words, this means the method provides flexibility and is capable of using numerous photographic images up to 100% in all UV layouts for texturing.

One of the above steps may be performed on a computer.

Figure 16:
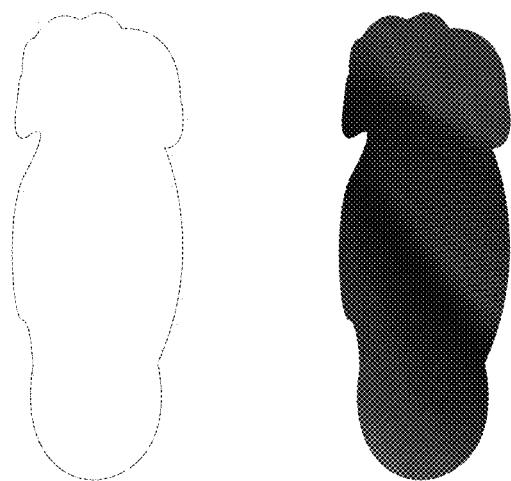
FIG. 16 illustrates an example of uniform texture pattern of a seat part of 3D-model.

FIG. 16 illustrates a seat surface having uniform pattern in one example. Texturing of certain external and/or internal surfaces such as surfaces having single colour and surfaces containing uniform texture can be textured using colour, or combination of colour and photo-editing of photographs or video. As the seat surface have uniform pattern, photo-editing measures can also provide realistic textures for such surfaces as an alternative of using real photographs for entire seat surface. Photo-editing of real photographs and/or videos includes photo-editing to enhance the photographs/video quality, cropping photographs, photo-editing to obtain texture patch from the photographs and/or videos, tiling or clone patching using known techniques.

Figure 17:
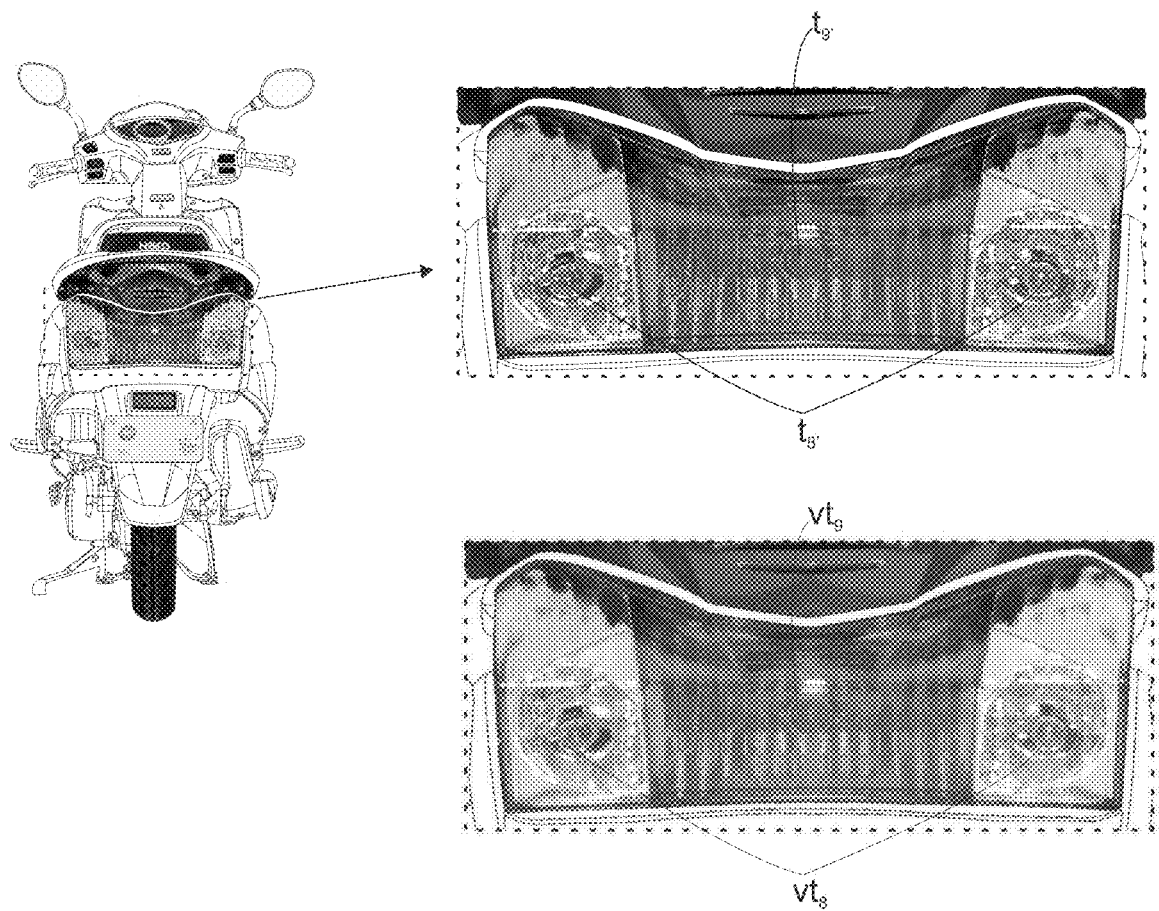
FIG. 17 illustrates an example of having multiple textures for same surface on 3D-model, according to an embodiment of the present invention.

FIG. 17, through illustrations (a)-(b) illustrates different views of a rear light surface section in the 3D model showing use of texture data of both photographs and video for the rear light surface in the 3D model. In illustration (a) of FIG. 17, the rear light surface is textured using photographs producing texture ($t_{8'}, t_{9'}$) for lights in off-mode. The same rear light surface, which is a functioning surface, while during operating of lights in On-mode, and blinking mode, different videos are captured as discussed in FIG. 3c. The captured videos can be used as texture ($vt_{8'}, vt_{9'}$), and applied on UV layout of rear light surface one at a time, and then stored as calibrated texture. Thus, a single UV layout may have multiple textures, which are used during user-controlled interactions, as per the interaction performed such as interaction to see lighting effect, or blinking. A particular UV can have a texture data set comprising of photographs {1-n} and video {1-n}, which can be used in user-controlled interaction.

Figure 18:
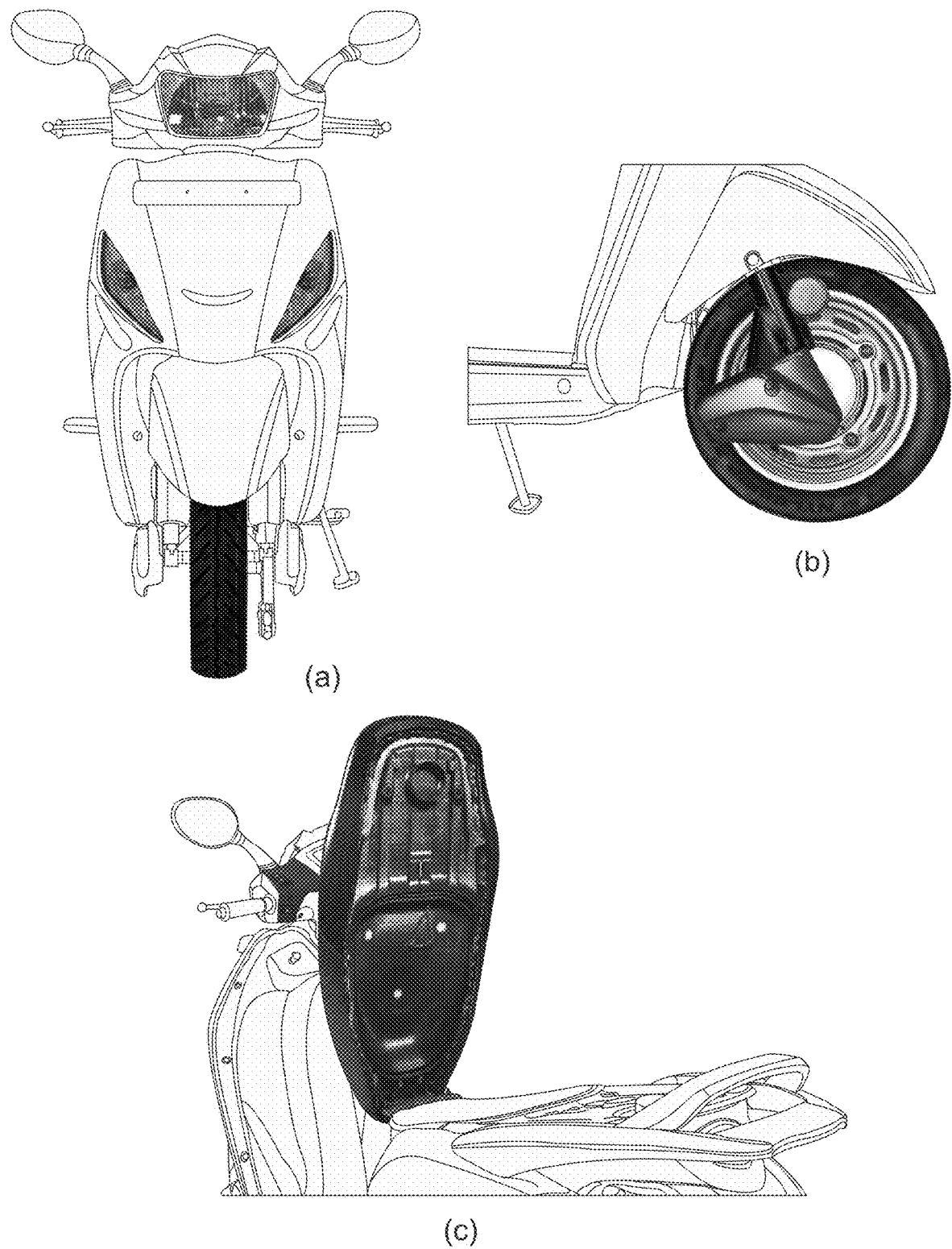
FIG. 18 illustrates, through illustrations (a)-(c), schematic representation of textured 3D model of scooter in an example using a texturing method of the present invention of FIG. 14 or FIG. 15, according to an embodiment of the present invention.

FIG. 18 illustrates, through illustrations (a)-(c), schematic representation of 3D model of scooter textured using real photographs in an example, using texturing methods of the present according to an embodiment of the present invention. The 3D model (shown here in black and white drawings and part images) provides or retains minute details and vivid appearance replicating view of real scooter texture. The exterior and interior of the 3D model looks real, and maintains minute details when viewed from different field of view, or even when individual parts are separated from the 3D model during user-controlled realistic interactions such as intrusive interactions. Internal surfaces of the textured and 3D model look extremely real and vivid. Illustration (c) of FIG. 16 shows schematically internal surfaces of seat and external surfaces of seat holder.

Figure 19:
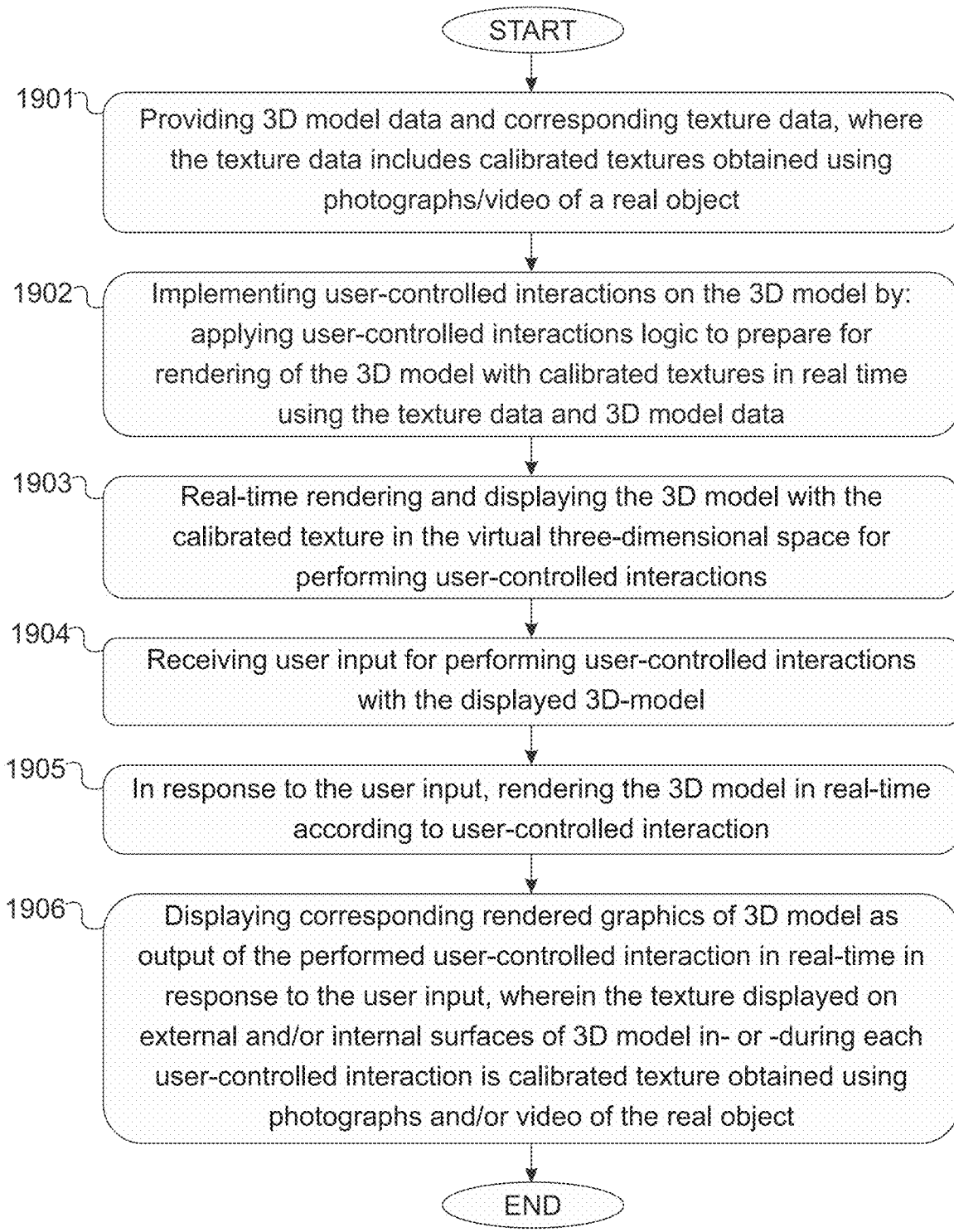
FIG. 19 illustrates a display method for displaying a 3D model in a virtual three-dimensional space on a Graphical User Interface (GUI) for performing user-controlled interactions in one example.
Figure 20:
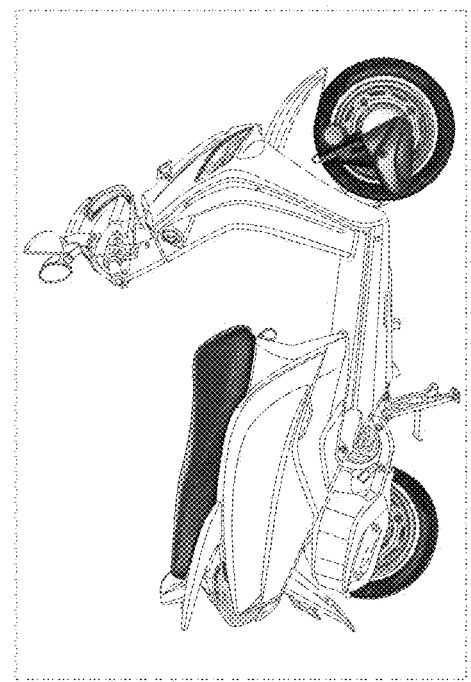
FIG. 20 illustrates user-controlled interactions in one example.
Figure 20:
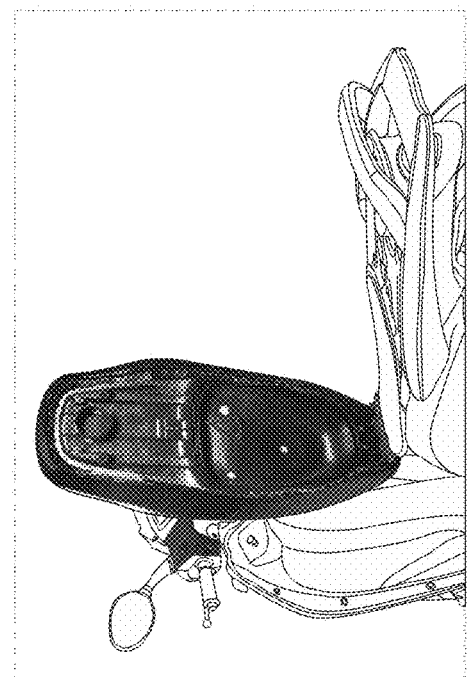
Figure 20:
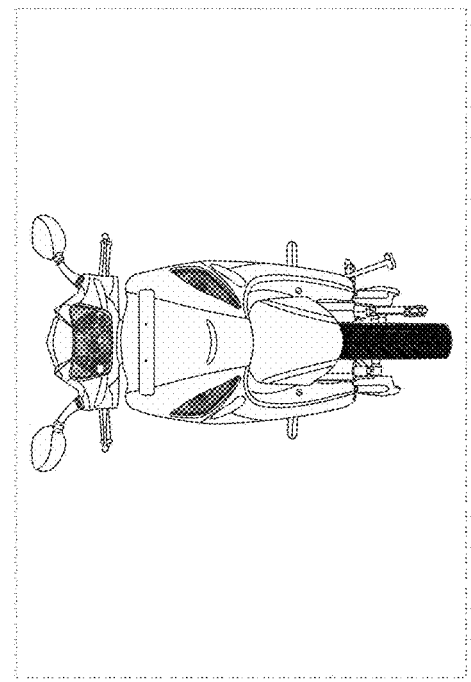
Figure 20:
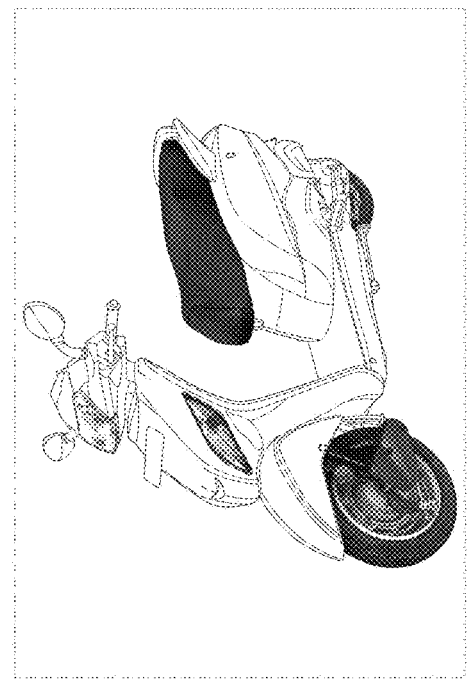

In FIG. 19, a display method for displaying a 3D model in a virtual three-dimensional space on a Graphical User Interface (GUI) for performing user-controlled interactions is illustrated in one example. The method involves providing 3D model data and corresponding texture data (step 1901). The texture data includes calibrated textures obtained using photographs/video of a real object obtained in texturing method of FIG. 15. At step 1902, implementing user-controlled interactions on the 3D model is carried out. The implementation of user-controlled interactions comprises applying user-controlled interactions logic to prepare for rendering of the 3D model with calibrated textures in real time using the provided texture data and the 3D model data. At step 1903, real-time rendering and displaying the 3D model with the calibrated texture in the virtual three-dimensional space for performing user-controlled interactions takes place. The 3D model once rendered and displayed in the virtual three-dimensional space on GUI, all consequent user-controlled interactions can be done in continuation of previous interaction. Step 1904, involves receiving user input for performing user-controlled interactions with the displayed 3D-model. At step 1905, in response to the user input, rendering the 3D model in real-time according to user-controlled interaction takes place. A separate 3D model is not loaded in response to user input for performing user-controlled interaction. At step 1906, corresponding rendered graphics of 3D model is displayed as output of the performed user-controlled interaction in real-time in response to the user input. The 3D model is displayed with a background scene in one embodiment or without a background scene in another embodiment. A background scene when present may be still background or movable background scene. The last view, position and orientation of the 3D model in each user-controlled interaction is preserved for receiving input for next user-controlled interaction in any position or orientation. The texture displayed on external and/or internal surfaces of 3D model in- or -during each user-controlled interaction is calibrated texture obtained using photographs and/or video of the real object providing real-like look and feel on the displayed 3D model. The interactive 3D model can be displayed in virtual three-dimensional space on a GUI over a webpage through a network such as INTERNET, LAN, WAN or the like. The interactive 3D model, in one implementation, can be displayed in virtual three-dimensional space on a GUI in application software over a display. The display can be an electronic display, a projection based display, a wearable near eye display or a see through display. Examples of user-controlled interaction is illustrated in FIG. 20, through illustrations (a)-(d), where a 3D model of bike is rotated to different positions on providing user input, and where during rotation, real-like texture is displayed using the texturing methods of the present invention. In illustration (c), a head light part can be put in ON mode in an interaction using texture of video for the functional part. Illustration (d) shows opening of seat part in an interaction to show internal surface in zoomed view also textured realistically with calibrated texture of photographs.

The above display method is realized on a system comprising:
  one or more processors;
  at least a non-transitory computer readable storage medium configured to contain:
  a database configured to store 3D model data and corresponding texture data, where the texture data includes calibrated textures of real photographs and/or video obtained from the texturing method as discussed in FIG. 14 or FIG. 15;
  instructions stored in the non-transitory computer readable storage system executable by the one or more processors that upon such execution cause the one or more processors to perform operations comprising:

providing the 3D model data and corresponding texture data;

implementing user-controlled interactions on the 3D model by applying user-controlled interactions logic, using one or more processors, on the 3D model to transform the 3D model into an interactive 3D model in real time using the texture data and the 3D model data;

real-time rendering and displaying the 3D model with the calibrated texture in a virtual three-dimensional space on a GUI for performing user-controlled interactions;

receiving user input for performing user-controlled interactions with the displayed 3D-model;

in response to the user input, rendering the 3D model in real-time according to user-controlled interaction;

displaying corresponding rendered graphics of 3D model as output of the performed user-controlled interaction in real-time in response to the user input, where the texture displayed on external and/or internal surfaces of 3D model in—or—during each user-controlled interactions is calibrated texture obtained using photographs and/or video of the real object. The steps are repeated for performing each user-controlled interaction. The user input is a touch input, input through a pointing device or a keyboard, or a gesture input. The texture data includes calibrated textures of real photographs and/or videos of real 3D object and real 3D object's variants; and texture made by photo-editing of real photographs. The GUI can be accessible over a web-page via hypertext transfer protocol.

It will be noted that the schematic representations are used for purposes of explaining the present invention, and are not coloured photographs of the textured and 3D-model/s or actual textured 3D-model as per present invention.

Although a variety of examples and other information have been used to explain various aspects within the scope of the appended claims, no limitations of the claims should be implied based on particular features or arrangement in such examples, as one ordinary skill would be able to use these examples to derive a wide variety of implementations. For example, the textured 3D-model obtained by the texturing method (FIG. 14, FIG. 15) of the present invention, may be used to create rendered images of the textured 3D-model for different surfaces of external and internal parts. As the textured 3D-model obtained by the texturing method looks real due to use of real photographs and/or video for texturing, the rendered images from the textured 3D-model will carry improved looks and texture, and can be used for texturing of another similar 3D models using teachings of this patent application, instead of directly using real photographs. Hence, this aspect or implementation shall also be considered within the scope of the appended claims.

The present embodiments are, therefore, to be considered as merely illustrative and not restrictive, and the described features and steps are disclosed as examples of components of systems and methods that are deemed to be within the scope of the following claims.

We claim:

1. A computer implemented method for generating texture of various parts of a three-dimensional (3D) model is subject to user-controlled interactions, such that the effect of user-controlled interaction is adapted to be displayed onto the parts of the 3D model, the method comprising:

UV unwrapping of one or more surface/s of one or more parts of the 3D model by the processor; and generating UV layout for the surface/s by the processor;

obtaining a texture data photograph/s and corresponding to each UV layout from a database stored in a non-transitory computer readable storage medium by the processor;

applying obtained texture data identified photograph/s on each UV layout by the processor to obtain texture for each corresponding UV layout;

joining or adjacently placing UV layouts by the processor and forming texture for the surface/s; and joining the surfaces by the processor for generating texture of the part/s of the 3D model, wherein the texture data comprises at least one of captured photographs of the real object or it's variant, edited photographs of the real object or it's variant, captured videos of the real object or it's variant, edited videos of the real objects or it's variant, and color, or combination thereof, wherein the interaction comprises at least one of extrusive interaction, intrusive interactions, a time bound change based interaction, or a real environment mapping based interaction, or combination thereof, as per user choice, or as per characteristics, state and nature of the said object, or combination thereof;

wherein the time bound changes refers to representation of changes in the 3D model demonstrating change in physical property of object in a span of time on using or operating of the object, and real environment mapping refers to capturing a real time environment, mapping and simulating the real time environment to create a simulated environment for interacting with the 3D model.

2. The method as claimed in claim 1, wherein the photographs and/or video of the real object, and/or the real objects variants are obtained by different photograph or video capturing manners, using a photographing or video graphing device, which comprises at least one capturing photograph normal to a surface or a face of the surface of the real object;

capturing photographs of whole surface of the real object model from different fields of view;

capturing photographs of chosen external and/or internal surfaces of the real 3D object by dismantling each chosen external and/or internal part from the real object by dismantling each chosen external and/or internal part from the 3D object;

capturing close-up photographs of a mark region appearing in the real object, where the mark region includes marks, logo, instructions, words, symbols and/or drawings, and where the mark region is present, a close-up photograph of mark region is captured separately, and applied on corresponding UV layout drawn specifically for the mark region; and/or capturing photographs of different textures, shades and/or pattern appearing in the real object, capturing video normal to surface of functional part of the real 3D object, while the functional part is in operative state or functioning, or combination thereof.

3. The method as claimed in claim 2, wherein the chosen external and/or internal surfaces are external and/or internal surfaces of external and/or internal parts of the real object displayed in- or during-different user-controlled interactions.

4. The method as claimed in claim 2, wherein the real 3D object's variants are variants or similar versions of the real object having same shape as of the real object, and containing at least one texture, pattern or mark region different from the real object to be considered eligible as a real object's variant.

5. The method as claimed in claim 1, wherein the photographing device comprises a digital camera.

6. The method as claimed in claim 1, wherein the digital camera is a non-fixed and high resolution digital camera.

7. The method as claimed in claim 1, wherein the chosen external and/or internal surfaces are external and/or internal surfaces of external and/or internal parts of the real object selected for texturing using photographs.

8. The method as claimed in claim 1, wherein performing first calibration while applying identified photograph/s on each UV layout, wherein the first calibration comprises at least one of:

removing visible artifact including seams by editing of photographs at boundary;

if a single photograph is identified or after joining identified photographs to single photographic image, matching edges of the single photographic image with edges of corresponding UV layout;

where if both edges do not coincide, performing calibration on edges of the UV layout mesh to match with edges of the corresponding photographic image and/or editing the photographs at boundary; and where on coinciding or matching of the edges of UV layout mesh with the corresponding photographic image, denoting the applying of photographic image on the UV layout as correct, and distortion free; and proceeding to next UV layout, or combination thereof.

9. The method as claimed in claim 8, wherein the first calibration for video comprises:

identifying video/s related to each UV layout for functioning surfaces;

if two or more videos, captured from different fields of view of a certain functioning surface for a UV layout, are identified, then merging the identified videos to obtain a single video for the entire functioning surface, while performing time synchronization to match or synchronize image frames of the captured videos by video editing, where identified videos are captured from different fields of view to cover the entire functioning surface as single video cannot be captured of the functioning surface that is either curved or have surface area beyond the coverage of one field of view of the photograph and video capturing device, where said certain functioning surface includes surface of light emitting parts of 3D object or surface of operative parts of 3D object;

If a single video is identified for a UV layout, then time synchronization calibration is performed to generate one or more videos for operative/functioning surface;

matching edges of obtained video with edges of corresponding UV layout;

where if edges of obtained video do not coincide with edges of corresponding UVlayout, perform calibration on edges of UV layout mesh to match with edges of the video while adjusting UV layout and/or editing the video at boundary; and where on coinciding or matching of the edges of UV layout mesh with the corresponding video, denoting applying of the video on the UV layout as correct, and distortion free; and proceeding to next UV layout, wherein time synchronization involves adjusting time intervals, synchronizing image frames of multiple captured videos to make a single video and/or editing of video.

10. The method as claimed in claim 1, wherein performing the second and third calibration on select surfaces which are having at least one visible artifacts, while joining or adjacently placing UV layouts by the processor and forming texture for the surface/s, wherein the second calibration is performed by adjusting the UV layout mesh boundaries and photographic image and/or removing visible artifact including seams by editing of photographs at boundary.

11. The method as claimed in claim 10, wherein the second calibration further includes calibrating pixel allocation for the mark region separately for resolution such that the texture of the mark region is clear and vivid.

12. The method as claimed in claim 1, wherein in the 3D model, the surfaces corresponding to real object having single colour, or surfaces containing uniform texture are textured using colour, or combination of colour and texture obtained by photo-editing of real photographs.

13. The method as claimed in claim 1, wherein the number of photographic images used for texturing the 3D model ranges from 10%-100% of total number of the images used in the total of all of the UV layouts provided, if images other than photographs are used in texturing.

14. The method as claimed in claim 1, wherein in the 3D model, the chosen external and/or internal surfaces, which corresponds to non-mono-color surfaces and surfaces which show pattern or non-uniform texture of real object, are textured by real photographs, videos or texture made by photo-editing of real photographs or videos, whereas surface/s, corresponding to uniform or mono-colour surface in the real 3D object, is/are textured by colour.

15. The method as claimed in claim 1, wherein the external and/or internal surfaces in the 3D model textured using real photographs and/video ranges from 10-100% of the total of all the surfaces, which corresponds to non-monocolour surface and surfaces which show pattern or non-uniform texture on the real 3d object displayed in orduring user-controlled interactions.

16. The method as claimed in claim 1, wherein for the 3D model, one or more textures is storable as calibrated texture data for same surface in the 3D model for use in user-controlled interactions for displaying dynamical texture changes in the 3D model during user-controlled interactions.

17. The method as claimed in claim 1, wherein in the 3D model, surface/s corresponding to functioning part in the real object is textured using video to display dynamic changing texture.

18. The method as claimed in claim 1, wherein performing a third calibration on selected surface/s which are having at least one visible artifacts, while joining the surfaces by the processor for generating texture of the part/s of the 3D model, wherein third calibration is performed by adjusting the UV layout mesh boundaries and photographic image and/or removing visible artifact including seams by editing of photographs at the boundaries of the surfaces while generating texture for the part/s of the 3D model.

19. The method according to claim 1, wherein when a part of the 3D model is a functional model of the real object, and for surfaces of the part whose texture changes dynamically during operation of the functioning parts, obtaining video/s for applying them on UV layouts for such surfaces from the database.

20. A computer implemented display method for displaying a 3D model in a virtual three-dimensional space on a Graphical User Interface (GUI) and for performing user-controlled interactions on the 3D model, wherein parts of the 3D model are textured using the method of claim 1, the method comprising:

obtaining 3D model data and a texture corresponding to the parts of the 3D model, from a database stored in a non-transitory computer readable storage medium by the processor;

receiving an user input for performing user-controlled interactions onto the 3D model or it's parts, performing the user input, and implementing the user-controlled interactions on the 3D model or on its parts by the processor, the user-controlled interactions are implemented by the processor by applying an user-controlled interactions logic related to the received user-controlled interaction using the 3D model data and the texture related to part or parts of the 3D model which are interacted to or onto which response of interaction is to be shown real-time rendering and displaying the user-controlled interaction being performed onto the 3D model or its parts, wherein the interaction comprises at least one of extrusive interaction, intrusive interactions, a time bound change based interaction, or a real environment mapping based interaction, or combination thereof, as per user choice, or as per characteristics, state and nature of the said object, or combination thereof;

wherein the time bound changes refers to representation of changes in the 3D model demonstrating change in physical property of object in a span of time on using or operating of the object, and real environment mapping refers to capturing a real time environment, mapping and simulating the real time environment to create a simulated environment for interacting with the 3D model.

21. The display method as claimed in claim 20, wherein the user-controlled interactions comprise interactions, resulting in change in view, position or orientation of the 3D model.

22. The display method as claimed in claim 20, wherein the interactive 3D model is displayable in virtual three-dimensional space on the GUI over a webpage through a network.

23. The display method as claimed in claim 20, wherein the 3D model is displayable in virtual three-dimensional space on GUI in application software over a display that includes an electronic display, a projection based display, a wearable near eye display or a see through display.

24. The display method as claimed in claim 20, wherein the 3D model once rendered and displayed in the virtual three-dimensional space on the GUI, all subsequent user-controlled interactions is doable in continuation without loading the separate 3D model in response to user input for performing user-controlled interaction, and wherein last view, position and orientation of the 3D model in each user-controlled interaction is preserved for receiving input for next user-controlled interaction in any position or orientation.

25. The display method as claimed in claim 20, wherein in the step of rendering user-controlled interactions onto the 3D model, the 3D model is displayed without any background scene.

26. The display method as claimed in claim 20, wherein in the step rendering user-controlled interactions onto the 3D model, the 3D model is displayed with a still or movable background scene.

27. The method as claimed in claim 20, wherein in the step of performing user controlled realistic interactions, one or more textures stored for same surface in the 3D model, is retrieved from the database for displaying dynamical texture changes in the 3D model during user-controlled interactions.

28. A system for displaying a 3D model in a virtual three-dimensional space on a Graphical User Interface (GUI) for performing user-controlled interactions, where the 3D model is textured using the method of claim 1, the system comprising:

one or more processors;

at least a non-transitory computer readable storage medium configured to contain:

a database configured to store 3D model data and corresponding texture instructions stored in the non-transitory computer readable storage system executable by the one or more processors that upon such execution cause the one or more processors to perform operations comprising:

obtaining 3D model data and a texture corresponding to the parts of the 3D model from a database stored in a non-transitory computer readable storage medium by a processor;

receiving an user input for performing user-controlled interactions onto the 3D model or it's parts, performing the user input, and implementing the user-controlled interactions on the 3D model or on its parts by the processor, the user-controlled interactions are implemented by the processor by applying an user-controlled interactions logic related to the received user-controlled interaction using the 3D model data and the texture related to part or parts of the 3D model which are interacted to or onto which response of interaction is to be shown;

real-time rendering and displaying the user-controlled interaction being performed onto the 3D model or it's parts, wherein the interaction comprises at least one of extrusive interaction, intrusive interactions, a time bound change based interaction, or a real environment mapping based interaction, or combination thereof, as per user choice, or as per characteristics, state and nature of the said object, or combination thereof;

wherein the time bound changes refers to representation of changes in the 3D model demonstrating change in physical property of object in a span of time on using or operating of the object, and real environment mapping refers to capturing a real time environment, mapping and simulating the real time environment to create a simulated environment for interacting with the 3D model.

29. The system as in claim 28, wherein the GUI is accessible over a web-page via hypertext transfer protocol.

30. The system as in claim 28, wherein the user input is a touch input, input through a pointing device or a keyboard, or a gesture input.

* * * * *